United States Patent
Suzuki et al.

[11] Patent Number: 6,164,118
[45] Date of Patent: Dec. 26, 2000

[54] CALIBRATION DISK HAVING DISCRETE BANDS OF CALIBRATION BUMPS

[75] Inventors: Shoji Suzuki; Daryl M. Shiraki; Jayadev P. Patel, all of San Jose; Dan Frusescu, Santa Clara; David Treves, Palo Alto; Tuan H. Hua, Milpitas, all of Calif.

[73] Assignee: Komag Incorporated, San Jose, Calif.

[21] Appl. No.: 09/164,208

[22] Filed: Sep. 30, 1998

[51] Int. Cl.[7] .......................................................... G11B 5/82
[52] U.S. Cl. .............................................................. 73/1.89
[58] Field of Search ........................... 73/1.89, 104, 105; 360/131, 135; 428/694 TR, 694 BR, 694 SG

[56] References Cited

U.S. PATENT DOCUMENTS

| | | | |
|---|---|---|---|
| 4,532,802 | 8/1985 | Yeack-Scanton et al. | 73/432 |
| 5,423,207 | 6/1995 | Flechsig et al. | 73/104 |
| 5,527,110 | 6/1996 | Abraham et al. | 374/5 |
| 5,528,922 | 6/1996 | Baumgart et al. | 73/1 J |
| 5,550,696 | 8/1996 | Nguyen | 360/135 |
| 5,631,408 | 5/1997 | Baumgart et al. | 73/1.81 |
| 5,675,462 | 10/1997 | Ayabe | 360/135 |
| 5,689,057 | 11/1997 | Baumgart et al. | 73/1 J |
| 5,956,217 | 9/1999 | Xuan et al. | 360/135 |
| 5,959,814 | 9/1999 | Mallary et al. | 360/135 |
| 5,973,894 | 11/1999 | Oshawa et al. | 360/135 |
| 5,981,903 | 11/1999 | Baumgart et al. | 360/135 |

OTHER PUBLICATIONS

Phase Metrics DFHT Manual 30, 150 Rev. D, Nov. 1, 1994, pp. 7–14.

*Primary Examiner*—Robert Raevis
*Attorney, Agent, or Firm*—Skjerven, Morrill, Macpherson, Franklin & Friel LLP; David E. Steuber; Michael J. Halbert

[57] ABSTRACT

A calibration disk for calibrating the fly height of a head, includes spaced circumferencial bands on the disk extending in a concentric fashion from adjacent an outer diameter of the disk to near an inner diameter of the disk. Each of the bands include radial and circumferencial spaced asperity emulating bumps having a population sufficient to produce a constant and continuous output signal from a glide head when the glide head flies lower than a maximum height of the bumps. The height of the bumps within individual bands are substantially uniform, and the average heights of the bumps in each band differ from each other. The configuration of the bumps on the calibration disk advantageously avoids errors caused by disk waviness, runout, and contamination. Further, using the differing heights of the bumps on the calibration disk, a glide head can be calibrated on the glide tester without using an independent fly height measurements for the glide head. Thus, errors in the fly height measurement and the delay in mounting each glide head to a fly height tester are avoided.

24 Claims, 30 Drawing Sheets

PZT signal with no interference

Lc = 6mm

Lc = 60μm

| Bump Ht. → | CLV Required for 0.1V Output (ips) | | | |
|---|---|---|---|---|
| | 1.21 | 0.93 | 0.85 | 0.56 |
| T-8J61-16 | 345 | 265 | 240 | 170 |
| T-8K99-10 | 400 | 310 | 280 | 180 |
| T-8J61-15 | 370 | 280 | 255 | 180 |
| T-8J61-10 | 430 | 310 | 280 | 190 |
| T-8J61-09 | 440 | 320 | 300 | 190 |
| T-8J61-03 | 460 | 365 | 335 | 225 |
| T-8J61-11 | 480 | 370 | 330 | 210 |
| T-8J61-01 | 440 | 330 | 300 | 190 |
| T-8K99-16 | 420 | 310 | 280 | 170 |
| T-8J61-12 | 490 | 370 | 340 | 210 |
| T-8J61-07 | 460 | 340 | 320 | 220 |
| T-8J61-13 | 540 | 410 | 380 | 235 |

| Bump Track → | #1 | #2 | #3 | #4 | |
|---|---|---|---|---|---|
| Bump Ht.(µ") → | 1.21 | 0.93 | 0.85 | 0.56 | |
| To change to 0.1V FH → | +0.13 | +0.13 | +0.13 | +0.13 | |
| 0.1V Fly Height → | 1.34 | 1.06 | 0.98 | 0.69 | |
| T-8J61-16 | 345 | 265 | 240 | 170 | |
| T-8K99-10 | 400 | 310 | 280 | 180 | |
| T-8J61-15 | 370 | 280 | 255 | 180 | |
| T-8J61-10 | 430 | 310 | 280 | 190 | |
| T-8J61-09 | 440 | 320 | 300 | 190 | |
| T-8J61-03 | 460 | 365 | 335 | 225 | CLV to get 0.1V Output |
| T-8J61-11 | 480 | 370 | 330 | 210 | |
| T-8J61-01 | 440 | 330 | 300 | 190 | |
| T-8K99-16 | 420 | 310 | 280 | 170 | |
| T-8J61-12 | 490 | 370 | 340 | 210 | |
| T-8J61-07 | 460 | 340 | 320 | 220 | |
| T-8J61-13 | 540 | 410 | 380 | 235 | |

| To Convert 0.1V IPS to 0.1V FH | |
|---|---|
| Slope | Constant |
| 0.003699 | 0.073 |
| 0.002950 | 0.154 |
| 0.003407 | 0.093 |
| 0.002686 | 0.204 |
| 0.002606 | 0.202 |
| 0.002762 | 0.060 |
| 0.002400 | 0.183 |
| 0.002603 | 0.197 |
| 0.002603 | 0.249 |
| 0.002326 | 0.197 |
| 0.002707 | 0.110 |
| 0.002135 | 0.181 |

| Fly Height → | 0.9μ" | 1.0μ" | 1.1μ" | 1.2μ" | 1.3μ" | 1.4μ" | 1.5μ" | Slope | Constant |
|---|---|---|---|---|---|---|---|---|---|
| T-8J61-16 | 214 | 248 | 282 | 315 | 349 | 380 | 411 | 0.003038 | 0.246 |
| T-8K99-10 | 230 | 267 | 303 | 339 | 375 | 410 | 444 | 0.002800 | 0.253 |
| T-8J61-15 | 236 | 274 | 311 | 348 | 385 | 421 | 456 | 0.002722 | 0.254 |
| T-8J61-10 | 274 | 311 | 348 | 385 | 422 | 459 | 496 | 0.002697 | 0.161 |
| T-8J61-09 | 266 | 306 | 346 | 386 | 426 | 466 | 506 | 0.002503 | 0.234 |
| T-8J61-03 | 270 | 309 | 348 | 387 | 426 | 465 | 504 | 0.002567 | 0.207 |
| T-8J61-11 | 282 | 322 | 361 | 401 | 440 | 480 | 520 | 0.002527 | 0.187 |
| T-8J61-01 | 295 | 337 | 378 | 420 | 462 | 506 | 549 | 0.002364 | 0.205 |
| T-8K99-16 | 288 | 332 | 377 | 425 | 473 | 524 | 574 | 0.002092 | 0.306 |
| T-8J61-12 | 322 | 361 | 399 | 438 | 476 | 518 | 559 | 0.002541 | 0.084 |
| T-8J61-07 | 339 | 380 | 421 | 463 | 504 | 550 | 596 | 0.002343 | 0.111 |
| T-8J61-13 | 337 | 381 | 426 | 470 | 515 | 563 | 612 | 0.002189 | 0.166 |

FIG. 25A

| μXAM Bump | Avalanche Point (ips) on 3 Tracks | | | Converted to FH Using FH Tester | | | Converted To FH w/ Bumps Calibration | | |
|---|---|---|---|---|---|---|---|---|---|
| Ht.- | 1.21 | 0.85 | 0.56 | 1.21 | 0.85 | 0.56 | 1.21 | 0.85 | 0.56 |
| T-8J61-16 | 390 | 270 | 200 | 1.43 | 0.85 | 0.56 | 1.21 | 0.85 | 0.56 |
| T-8K99-10 | 440 | 320 | 220 | 1.43 | 1.07 | 0.85 | 1.52 | 1.07 | 0.81 |
| T-8J61-15 | 410 | 290 | 190 | 1.48 | 1.15 | 0.87 | 1.45 | 1.10 | 0.80 |
| T-8J61-10 | 470 | 320 | 230 | 1.37 | 1.04 | 0.77 | 1.49 | 1.08 | 0.74 |
| T-8J61-09 | 470 | 350 | 230 | 1.43 | 1.02 | 0.78 | 1.47 | 1.06 | 0.82 |
| T-8J61-03 | 500 | 380 | 270 | 1.41 | 1.11 | 0.81 | 1.43 | 1.11 | 0.80 |
| T-8J61-11 | 520 | 370 | 250 | 1.49 | 1.18 | 0.90 | 1.44 | 1.07 | 0.81 |
| T-8J61-01 | 480 | 330 | 230 | 1.50 | 1.12 | 0.82 | 1.43 | 1.06 | 0.78 |
| T-8K99-16 | 470 | 320 | 210 | 1.34 | 0.98 | 0.75 | 1.45 | 1.08 | 0.80 |
| T-8J61-12 | 520 | 370 | 250 | 1.29 | 0.98 | 0.74 | 1.47 | 1.06 | 0.80 |
| T-8J61-07 | 490 | 350 | 250 | 1.41 | 1.02 | 0.72 | 1.41 | 1.06 | 0.78 |
| T-8J61-13 | 590 | 420 | 280 | 1.26 | 0.93 | 0.70 | 1.44 | 1.06 | 0.79 |
|  |  |  |  | 1.46 | 1.09 | 0.78 | 1.44 | 1.08 | 0.78 |
| Average |  |  |  | 1.41 | 1.06 | 0.79 | 1.45 | 1.08 | 0.79 |
| Range |  |  |  | 0.24 | 0.25 | 0.20 | 0.11 | 0.06 | 0.08 |
| STD |  |  |  | 0.08 | 0.08 | 0.06 | 0.03 | 0.02 | 0.02 |

FIG. 27A

CALIBRATION DISK HAVING DISCRETE BANDS OF CALIBRATION BUMPS

FIELD OF THE INVENTION

The present invention relates to a calibration disk that can be used for calibrating a glide head, used in the process of manufacturing hard memory disks.

BACKGROUND

The key components of a hard disk drive are a magnetic disk and a magnetic head, which is typically separated from the magnetic disk by a small gap. The gap is created by the magnetic head remaining relatively stationary while the magnetic disk rotates on a spindle. The rotation of the magnetic disk generates a thin film of air known as an "air bearing" over the surface of the disk that supports the magnetic head, which is essentially flying over the surface of the magnetic disk.

The recording density of the magnetic disk is strongly influenced by the gap or "fly height" between the disk and the magnetic head. Because decreasing the fly height of the magnetic head increases the recording density of the magnetic disk, the magnetic disk should have a very smooth surface so the magnetic head can fly very close to the surface. Magnetic disks with protrusions related to defects or contamination that exceed the fly height of the magnetic head must be eliminated. An impact between the magnetic head and a protrusion can cause undesirable effects, such as a hard drive crash, formation of wear debris, unusable recording area, and a thermal spike in a magnetoresistive head. In order to ensure smooth surface conditions of the magnetic disk in terms of protrusions, glide tests are widely employed by the hard disk industry.

The basic operation of the glide test is to fly a test head, i.e., a glide head, at a height related to the fly height and margin requirements of the magnetic head, and to sense any contact between the glide head and defects on the surface of the magnetic disk. If the glide head contacts a defect, the disk is rejected. The term "glide head" as used in the present disclosure indicates a head used in a magnetic disk testing system as distinguished from the term "magnetic head," which is used in general for a read-write head.

The contact detection is typically accomplished with a piezoelectric (PZT) sensor or an acoustic emission (AE) sensor. The PZT sensor, as is well known to those skilled in the art, uses a piezoelectric crystal to convert mechanical energy into an electrical signal. Thus, a PZT sensor converts the mechanical energy generated by the glide head contacting a defect into an electrical signal that can be used to indicate the size and location of the defect.

An AE sensor uses a sensing technique similar to a PZT sensor. The difference is the mounting position and configuration of the sensor. The sensing material in an AE sensor is typically a PZT ($PbZrO_3$–$PbTiO_3$) ceramic that has a piezoelectric effect and which is housed in a metal container and mounted close to the head/slider suspension. Both the PZT and AE sensors give electrical signals excited by acoustic vibration. For more information related to the aforementioned sensing technology see U.S. Pat. Nos. 5,423,207 and 4,532,802.

The magnetic disk may also be tested for defects sing non-contact methods such as a magneto-resistive (MR) head, a laser, or an optical tester. For more information related to MR technology see U.S. Pat. No. 5,527,110 ("the '110 patent"), and see U.S. Pat. No. 5,550,696 ("the '696 patent") for a method to calculate a protrusion height (in this case, a laser bump) based on a diffracted laser beam detected by a linear photo-detector array. An optical tester optically scans the magnetic disk for defects. The detection is usually performed by comparing the light reflected from a defect with the light reflected from an area of the disk that does not have defects. The optical tester is calibrated in such a way that a rejection of a magnetic disk occurs when the height of a defect is above a desired threshold.

Another important parameter of the magnetic disk is how low a head can fly without contacting the disk surface, known as the avalanche point. The avalanche point is different from the fly height of the head. While the fly height is usually determined by extrinsic defects, such as contamination, the avalanche point is determined by intrinsic surface design. The avalanche point is defined as the fly height at which the lowest part of the head starts to contact the disk surface. For example, the landing zone of a magnetic disk, which is usually textured to prevent excessive friction, has a high avalanche point due to the additional surface roughness created by the texturing. The data zone, however, has a smoother surface because there is no need to reduce friction. Consequently, a glide head can fly lower over the data zone than the landing zone, and thus, the data zone has a relatively lower avalanche point. The avalanche point is a useful indication of the surface finish and gives an absolute fly height below which flying is not possible without contacting the disk.

While magnetic disks are ideally flat and smooth, in practice there is typically an amount of disk waviness and runout. Disk waviness causes the effective height of a bump to vary relative to the mean disk surface. The variance is caused by the fact that the bump is defined by small area. The small area containing the single bump, however, may be at the peak of a wave or at the valley of a wave. If the waviness of the disk surface has a wavelength that is less than a longitudinal dimension of the glide head, the glide head cannot follow the disk surface. Consequently, the amplitude of the waviness must be added to the protrusion height. A typical amplitude of the waviness of a disk is 20 to 60 nm (nanometers) and has a wavelength that is typically smaller than the length of a conventional glide head.

Disk runout is a deviation from a level surface and is caused by improper clamping of the disk, for example. The runout effect typically creates a variation from a level surface over an area of the disk that is much greater than the length of the glide head. Disk runout causes acceleration of the glide head which induces fly height fluctuations. A typical disk runout is approximately 2 to 10 $\mu$m (micrometers).

Where the avalanche point is compared to the protrusion height, the avalanche point is typically 25 to 50 Å higher than the height of the protrusion because the protrusion height is locally measured and does not reflect the waviness or runout effect. The difference between avalanche point and protrusion height is more pronounced when the measurement is carried out close to the clamping area of the magnetic disk, which increases disk runout.

To accurately test a magnetic disk with a glide head, it is important for the glide head to be calibrated so that the glide height at which the test is carried out is known. Calibration ensures that the threshold for defects is at the appropriate height. A conventional method of calibration is performed by flying a glide head over a glass disk on a fly height tester. The fly height tester operates by passing a beam of light through the glass disk. The interference pattern of light reflected off the glide head and light reflected off the surface of the glass disk is used to determine the distance between the disk surface and the glide head. This procedure is performed for a number of different linear velocities of the glass disk to establish a linear velocity versus fly height relationship for that particular glide head.

The linear velocity versus fly height relationship is then used to determine the linear velocity at which to fly the glide head over production disks on a glide tester. Thus, the proper linear velocity can be used to achieve the desired glide height to test for defects on a production disk that are higher than the glide height. This procedure is done for each individual glide head because each glide head has different flying characteristics.

There are several drawbacks to the use of a fly height tester for calibration of a glide head. For example, the fly height tester uses a glass disk, which may have different characteristics than a production memory disk, including differences in surface texture, waviness and runout. Changes in surface texture will cause a change in the flying characteristics of the glide head and, thus, the fly height of the glide head may be different when the glide head flies over a production disk. The difference in waviness and runout between a glass disk and a production magnetic disk may additionally affect the accuracy of the calibration.

In addition, the fly height tester measures the fly height of the glide head at a limited number of points, i.e., only at the points where the light is incident on the glide head. Because the flying attitude of a glide head is not flat, i.e., the leading edge of the glide head is flying higher than the trailing edge, portions of the glide head may actually be lower than the points on the glide head being illuminated by light. Thus, the actual fly height of the lowest point on the glide head may be lower than the measured fly height.

Further problems encountered with using a fly height tester for calibration arise from the fact that the glide head is first installed on the fly height tester to determine fly height. The glide head is then removed from the fly height tester and installed on the glide tester to test production disks. Installing the glide head on two separate systems is time consuming and thus results in a loss of productivity. In addition, the glide head may be installed slightly differently on the glide tester than on the fly height tester. Differences in the installation on the two devices may cause differences in the flying characteristics of the glide head, including skew and mount flatness, thereby resulting in an inaccurate calibration of the glide head. Moreover, the Z height, which is the height between the disk surface and the suspension arm upon which the glide head is mounted, may differ between the fly height tester and the glide tester. Variances in Z height can also adversely affect the repeatability of the flying characteristics of the glide head from the fly height tester to the glide tester. A calibration disk as shown in U.S. Pat. No. 5,528,922 ("the '922 patent"), may be used to calibrate a glide head. The '922 patent uses laser bumps on a calibration disk as a height reference. Specifically, the '922 patent uses a laser beam to create crater-shaped bumps on a calibration disk to emulate undesirable asperities on a production disk and then uses the calibration disk to calibrate a glide head. While the '922 patent addresses the importance of the diameter of a laser bump to emulate a realistic defect found on a magnetic disk, there is, however, no consideration of other important aspects. For example, the '922 patent fails to consider laser bump wear, which prevents consistent calibrations and reduces the life of the calibration disk. Further, the '922 patent fails to account for disk waviness, disk runout, bump height distribution, or fly height distributions of glide heads, all of which may seriously affect the accuracy of the calibration of the glide head.

SUMMARY

In accordance with an embodiment of the present invention, a calibration disk includes a circumferencial band or alternately a series of circumferencial bands extending substantially concentric to each other from adjacent an outer diameter of the calibration disk to adjacent an inner portion of the calibration disk. Each of the circumferencial bands includes substantially circumferencial spaced calibration bumps having a population sufficient to produce a constant and continuous output signal from a glide head when the glide head flies lower than a maximum height of the bumps. Thus, the circumferencial spacing of the bumps may be less than the length of the glide head. The heights of the calibration bumps within an individual band are substantially uniform, and the bump heights for each band is slightly different. In addition, each band includes calibration bumps that extend radially and that are generally aligned with the circumferencial spaced bumps. The radial spacing of the calibration bumps in each band is less than a width of a rail of a glide head. As used herein "bands" is not to be confused with the normal data tracks on a production read-write magnetic hard disk.

The calibration disk can be double-sided with discrete bands of calibration bumps on both sides. Further, the calibration disk may have, but does not require, magnetizable layers on the surface with a middle layer of normally nickel-phosphorus-plated aluminum forming the disk base. The calibration bumps may be produced using a laser in a concentric or spiral pattern or any other appropriate manner. The height distribution of the calibration bumps is determined by measuring the bump heights by an interferometric optical microscope and then calculating the statistical numbers such as the average and the standard deviation.

The calibration bumps are advantageously durable and maintain their height integrity. Isolated bumps used on conventional calibration disks wear quickly because of the impact energy of the glide head is concentrated on a single bump, whereas the bumps on the calibration disk in accordance with an embodiment of the present invention have sufficient population to distribute the impact energy over multiple bumps, thereby increasing the durability of the bumps. Consequently, the calibration disk may be used for numerous calibrations without necessitating remeasurement of the bump heights.

In addition, the configuration of the bumps compensates for the waviness and runout effects of a disk as well as variations of fly height of glide heads. By fabricating the calibration bumps so the spacing between bumps is less than the characteristic wavelength of a disk surface, approximately 20 to 100 nm, and by statistically determining the height distribution of the bumps, the waviness and runout effects can be offset.

The calibration disk of the present invention is used to check the real flying conditions of a glide head while the glide head is mounted on a glide tester system, thereby obviating the need to independently test the fly height of the glide head on a fly height tester. Consequently, productivity loss and other problems associated with a fly height tester, such as variance in the glide head's flight characteristics due to remounting the glide head on the glide tester, are avoided.

The method of calibrating a glide head using the embodiment of the calibration disk with a series of discrete bands having known bump heights, includes mounting the glide head and the calibration disk on a glide tester. The plurality of bands, having different bump heights, are radially scanned by the glide head to determine the linear velocity of the disk required for the glide head to produce a specific average output signal, e.g., 0.1 volts (V). Thus, the radial scans generate the relationships between the linear velocity for producing a specific output signal from the glide head and the known bump heights for a plurality of bands. Because more than one band is used in this embodiment, the flying characteristics of the glide head can be determined using linear regression. Consequently, the glide head can be calibrated as a function of bump height based on the data obtained using the calibration disk.

Where it is desired for the glide head to be calibrated as a function of fly height, as is the present industry standard, the relationships between linear velocity and bump heights for the glide head is converted to relations between linear velocity and fly height using a conversion factor. For example, with a Conventional 50% glide head, the conversion is accomplished by adding an offset, e.g., $0.13\mu$", to the bump height to generate the fly height of the glide head at specific average output signal, e.g., 0.1V. By determining the relationship between linear velocity and fly height for at least two bump heights, the flying characteristics of the glide head can be generated using a linear regression. With this information, the glide head is calibrated so that the appropriate linear velocity can be used to generate the desired fly height of the glide head when testing for asperities on a production disk.

The conversion factor to convert bump height to fly height is determined by generating avalanche curves relating the linear velocity of the disk to the output signals for several glide heads. The avalanche points on the avalanche curves are aligned and the average difference between the linear velocity at the avalanche point and the linear velocity used to produce the specific output signal, e.g., 0.1V, is determined. This average difference was found to be 33 ips, however, it should be understood that the accuracy of this average difference may improve with the use of a greater sampling of glide heads. Further, if the type of glide heads or the characteristics of the calibration disk are changed, the average difference may also change. Using a large sampling of glide heads to generate an average fly height to linear velocity relationship, the average difference of 33 ips can be converted to an equivalent average difference of $0.09\mu$" for the particular disks used.

In addition, avalanche curves relating fly height to average output signals for several glide heads are used to obtain the average difference between avalanche points and bump heights. The average difference between avalanche points and bump heights was found to be $0.22\mu$". It should be understood, however, that this number may be refined with additional experimentation.

Using the average difference between an avalanche point and the linear velocity used to produce the specific output signal (which is converted to an equivalent height) and the average difference between an avalanche point and the bump height, i.e., respectively $0.09\mu$" and $0.23\mu$", the $0.13\mu$" factor to convert bump height to fly height is obtained.

BRIEF DESCRIPTION OF THE DRAWINGS

The above and other features, aspects, and advantages of the present invention will become better understood with regard to the following description, appended claims, and accompanying figures, where:

FIG. 22 is a table showing the conversion factors to be used with each of the twelve glide heads to convert linear velocity into fly height;

FIGS. 25A and 25B are a respective table and graph of data relating disk velocity and fly height of the twelve glide heads as determined by a fly height tester;

FIGS. 27A, 27B, and 27C are a table and graphs of the avalanche points of the glide heads over three bands of the calibration disk where the avalanche points are converted using a conventional fly height tester and using a calibration disk in accordance with the present invention.

DETAILED DESCRIPTION

Figure 1A:
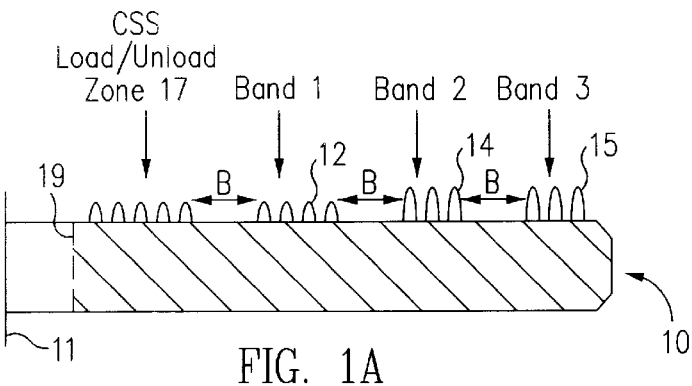
FIG. 1A is a schematic cross-sectional half view of a calibration disk with a wide CSS zone and three bands of calibration bumps.
Figure 1B:
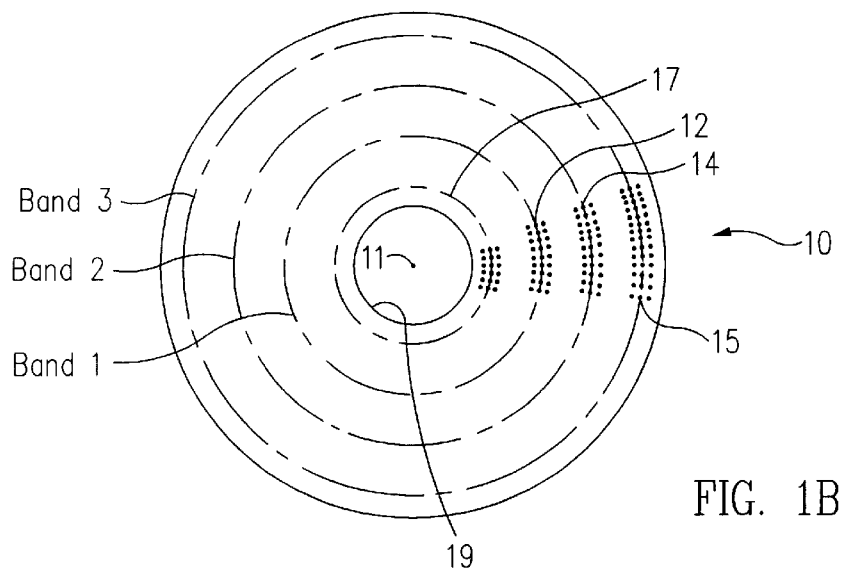
FIG. 1B is a plan view of the calibration disk from FIG. 1A.

FIGS. 1A and 1B show a schematic cross-sectional half view and a plan view, respectively, of a calibration disk 10 about disk center line 11. Calibration disk 10 has a central aperture forming an inside diameter 19, three distinctive circumferencial bands 1, 2, and 3 and one Contact Start and Stop (CSS) zone 17 for head load/unload, as shown in FIG. 1A. The bands 1, 2, and 3 as well as the CSS zone 17 include a number of calibration bumps. The calibration bumps in an individual band have approximately the same height, while the bump heights differ from one band to the next, as shown in FIG. 1A. The CSS zone is used as a load/unload zone for a glide head if contact start and stop is needed.

Although only one side of the disk has laser bumps in FIG. 1A, one of ordinary skill in the art will understand that bands of calibration bumps can be applied on both sides of calibration disk 10 and thus calibration disk 10 can be used for calibration on both sides at the same time. Moreover, it should be understood that three bands are shown for illustrative purposes and that additional or fewer bands may be used as desired.

The bumps around circumferencial bands 1, 2, and 3 are substantially circular bands of spaced features. Bands 1, 2, and 3 have several rows 12, 14, and 15 of individual laser bumps. Alternatively, each band may have only one row of bumps if desired. The distance B, between bands 1, 2, and 3, as well as the distance from the CSS zone 17 to the inner band 1, is wider than the width of the glide head (FIG. 3) to ensure a single contact condition per band, i.e., the glide head cannot contact two bands simultaneously. Thus, bands 1, 2, and 3 on calibration disk 10 are discrete bands. While only some bumps are shown in FIG. 1B, the rows of bumps are concentric to each other and extend around the entire circumference of the disk. The rows of calibration bumps in each band may be circular or in an essentially cylindrical spiral, as will be understood by those of ordinary skill in the art. There may be some individual bumps in between the discrete bands on calibration disk, for example, where the calibration bumps are produced in a cylindrical spiral, the spiral of bumps may continue between the discrete bands but at a lesser frequency. The few bumps that may be located between the discrete bands may cause signal spikes during calibration using calibration disk 10, but these signal spikes may be ignored and therefore do not affect calibration. Consequently, while calibration disk 10 has discrete bands 1, 2, and 3, the bands may not necessarily be completely discontinuous.

The bumps on calibration disk 10 are produced using a laser, which is well understood by those of ordinary skill in the art. The bumps may also be produced using other non-laser methods suitable to make very small protrusions on a magnetic disk, such as a masking/etching technique, which is also well known to those of ordinary skill in the art. After the bumps are fabricated, the disk is processed using the same manufacturing processes used for a typical production magnetic disk, e.g. by the addition of magnetizable material on the data-receiving surface(s). Of course, it should be understood that the specific order of processing steps is not critical to the present invention, and therefore the bumps may be produced at the end of the processing steps if desired. Consequently, calibration disk 10 closely approximates the surface conditions, such as texture and lubrication, that are found on a typical production magnetic disk, with the addition of a number of bands each having a row or rows of calibration bumps.

Figure 2:
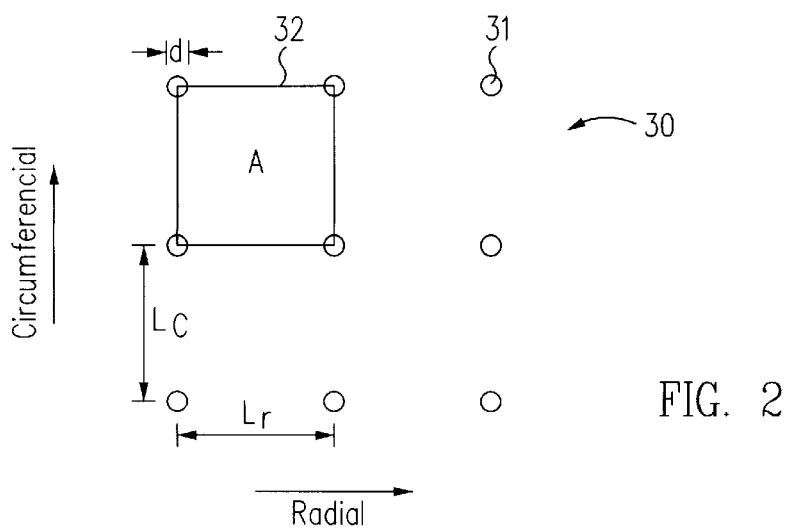
FIG. 2 is a schematic partial enlarged top view of a grid design showing circumferencial distance Lc and radial distance Lr of the calibration bumps.

The placement of laser bumps in each band of calibration disk 10 is determined in relation to the size of the glide head to be calibrated. FIG. 2, for example, shows a grid 30 of nine individual laser bumps 31, in which Lc denotes the circumferencial spacing length, i.e., the spacing length in a tangential direction, and Lr denotes the spacing length in a radial direction, i.e., the spacing length in the direction between the inside diameter and the outside diameter.

Figure 3:
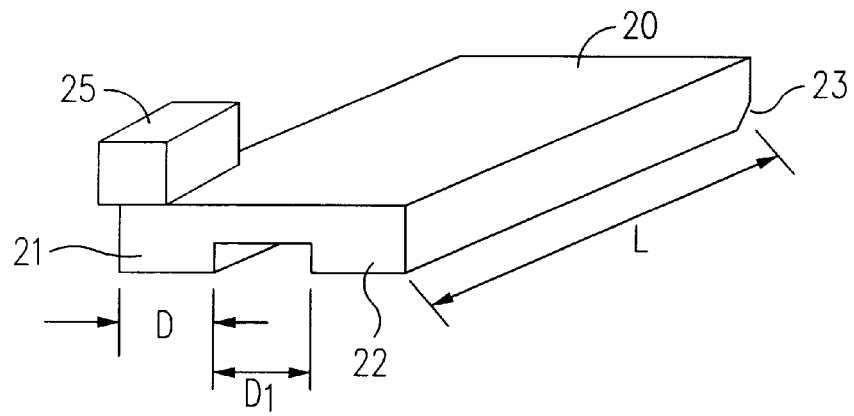
FIG. 3 is a perspective view of a typical glide head with a PZT crystal sensor for contact detection.

FIG. 3 shows a perspective view of a typical glide head 20 with two rails 21, 22, each having a width D and length L. Rails 21, 22 are separated by a distance $D_1$. Rails 21, 22 of glide head 20 are typically flat and tapered at the leading end 23. However, various kinds of glide head designs can be utilized in conjunction with calibration disk 10 as long as the glide head is designed to form an air bearing. Glide head 20 includes a contact detection sensor 25, such as a PZT sensor, and is mounted on a suspension arm (not shown). The sensor flexes when an asperity or a disk is contacted by the slide head, emitting a PZT signal. An example of a suitable glide head for calibration with calibration disk 10 is a 50% size glide head with a Type II suspension, a gram load of 9.5 grams, and with a compressive PZT sensor available from Glide/Write, Inc. of San Jose, Calif. A typical 50% size glide head has a length L of rails 21, 22 of approximately 2 mm and a width D of the individual rails of approximately 200 μm. Also, an AE sensor such Model No. S9225 available from Physical Acoustics Corp. of Princeton, N.J. can be used as sensor 25. Of course, other types of sensors may be used with the glide head being calibrated with calibration disk 10, including a magnetic-resistive sensor, a thermal asperity sensor, and a photo-detector array sensor. Calibration of non-contact testers can be conducted by registering the output signal level from the sensing device as a function of the known bump height on calibration disk 10. The output signal level can then be used to estimate the height of an unknown object on a production disk.

For calibration purposes, the bumps in each band of calibration disk 10 have a population sufficient to produce a constant and continuous output signal from a glide head when the glide head flies lower than a maximum height of the bumps. Thus, the circumferencial distance Lc should be less than the length L of rails 21, 22 (shown in FIG. 2). While the circumferencial distance Lc can be longer than the length L of rails 21, 22, the bumps will appear as independent bumps so that the contact signal generated by the glide head will be intermittent and the wear on the bumps will be increased, which is one of the shortcomings of the previous technologies. It is also desirable for the radial distance Lr between bumps (shown in FIG. 2) to be less than the width D of an individual rail (shown in FIG. 3). The radial distance Lr is also less than the distance $D_1$ between rails 21, 22.

It has been found that a circumferencial distance Lc between 20 μm to 2 mm (where the length L of rails 21, 22 is 2 mm) and a radial distance Lr between 10 μm to 150 μm (where the width D of an individual rail is 200 μm) are suitable dimensions for calibration disk 10 when used to calibrate a 50% size glide head. Where a 30% size glide head is used, the distance Lc may be up to 1.25 mm, and up to 0.85 mm for a 20% size glide head.

In addition, the configuration of bumps should be such that the total bump area is small compared to the non-bump area so that the glide head's flying characteristics are not affected. As shown in FIG. 2, the area between bumps is approximated by square 32 heaving an area A, where each bump has a diameter of d. Assuming that the bump diameter d is 12 µm and the circumferencial distance Lc and radial distance Lr are both 60 µm, the ratio of bump area to total area is 113 µm²/3600 µm² or approximately three percent.

The bump spacing is generally determined experimentally. The spacing is wider than the diameter of the bumps themselves to avoid overlap of bumps and so that the total area A is greater than the bump area. Further, the spacing is shorter than the length L of the rails 21, 22 so that contacts between the glide head and the bump produces an approximately continuous output signal.

If the circumferential distance Lc between bumps is greater than the length L of rails 21, 22, the bumps will create intermittent contact signals, or pressure waves, at a frequency determined by the distance Lc and the linear velocity of calibration disk 10, i.e., the frequency is equal to linear velocity divided by the distance Lc. If the frequency happens to be at the same frequency as either the air bearing or glide head resonance frequency, the PZT signal from PZT sensor 25 will show an undesirably high output signal. Because the air bearing acts as a spring and has a natural vibration frequency of typically 50 kHz to 100 kHz, a non-contact phenomena known as the resonance effect has the potential to disturb the calibration of the glide head, when the rotational velocity matches the aforementioned speed. For example, if the circumferential distance Lc is 40 µm at a one inch radius on calibration disk 10 and the rotational speed for the glide is 1500 rpm, a frequency of 100 kHz is generated, which is the air bearing resonance frequency. The glide head itself similarly has a resonance frequency, at approximately 450 kHz. Typically, the calibration disk 10 is used at a frequency band of 200 kHz to 800 kHz, thus, the glide head resonance effect may disturb the calibration of the glide head.

The resonance effect can be avoided by carefully selecting or randomizing the circumferential distance Lc, such that the frequency of contact is not at the resonance frequency of the air bearing or glide head.

Figure 4:
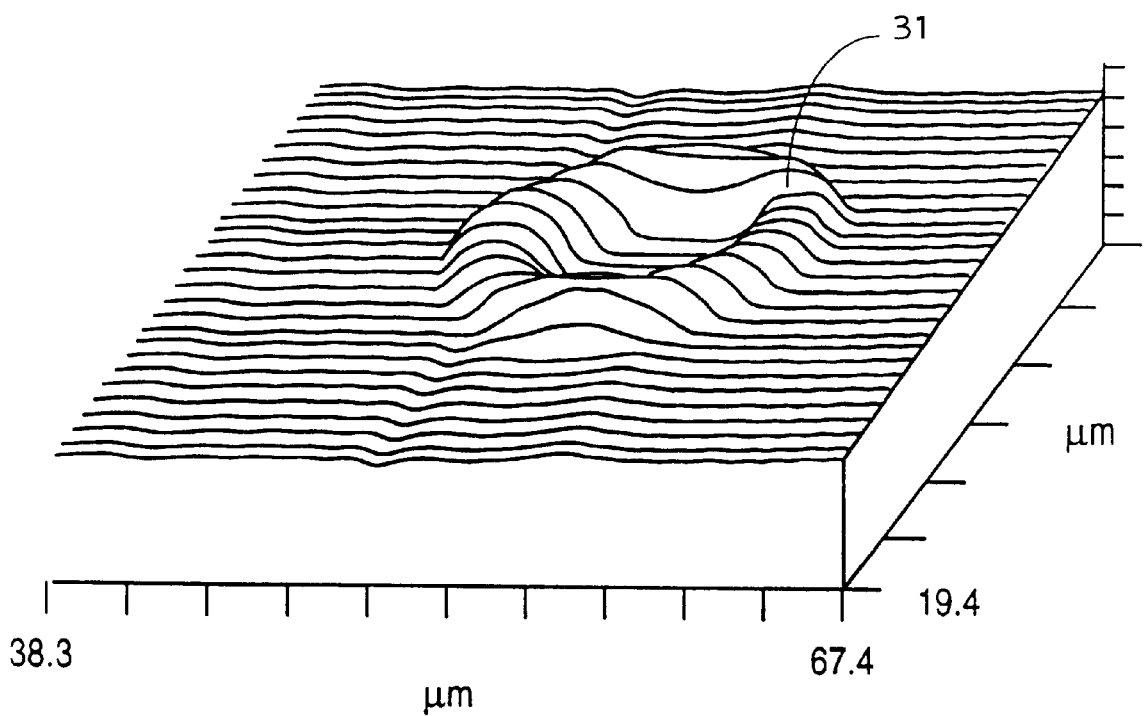
FIG. 4 is a view of an atomic force microscope (AFM) image of a typical laser bump.

FIG. 4 is an atomic force microscope (AFM) image of a typical laser bump 31 with a diameter of approximately 7 µm. Any size bump between 4 to 12 µm may be used as they exhibit similar behaviors in terms of interaction with a glide head. An important factor for using the bump for calibration is control of the bump height. Although the principles of the present invention do not require the use of laser bumps to generate the protrusions on calibration disk 10, laser bump technology gives good control over bump height. The laser bumps may be placed on the disk using the technique shown in U.S. Pat. No. 5,528,922, which is incorporated herein by reference.

Figure 5:
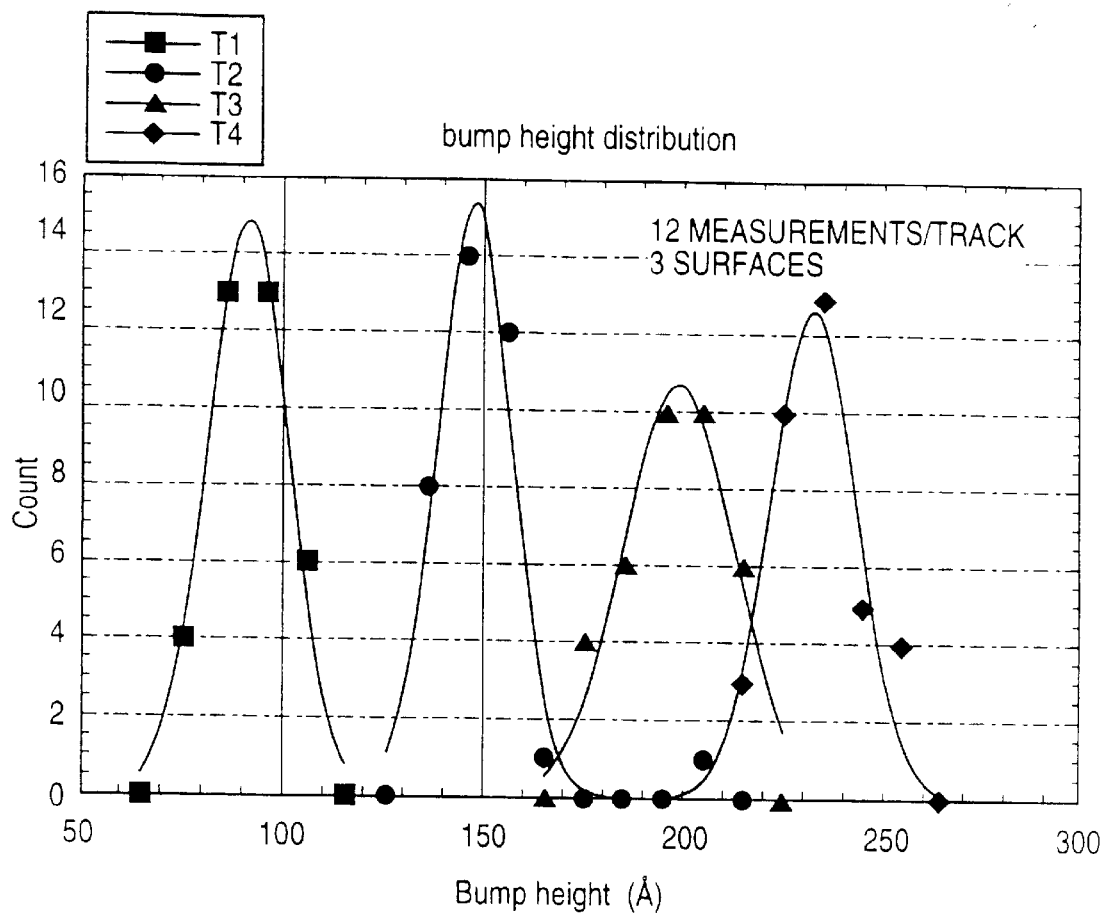
FIG. 5 is a graph showing bump height distributions of a calibration disk with four bands.

FIG. 5 is a graph showing bump height distributions taken from a calibration disk with four discrete bands. As can be seen in FIG. 5, the bump heights for each band differ. Further, the bump heights for each band are controlled to within approximately 50 Å.

Figure 6A:
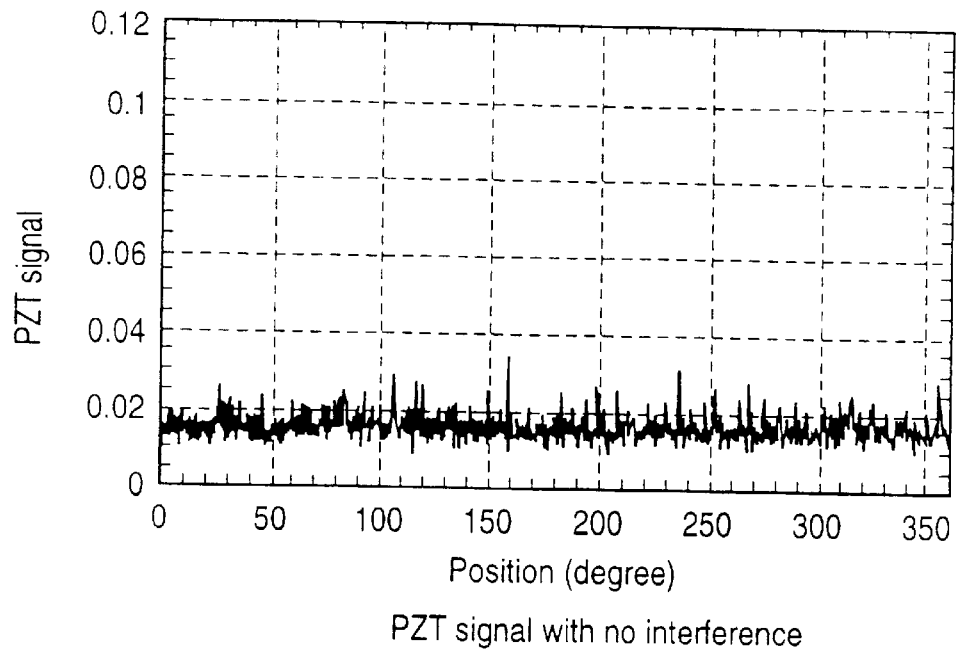
FIGS. 6A, 6B and 6C are PZT output signals over one revolution of a calibration disk showing no interference (FIG. 6A), and positive interference of the PZT output signals from two different laser bump spacings (6 mm and 60 $\mu$m) (FIGS. 6B and 6C)
Figure 6B:
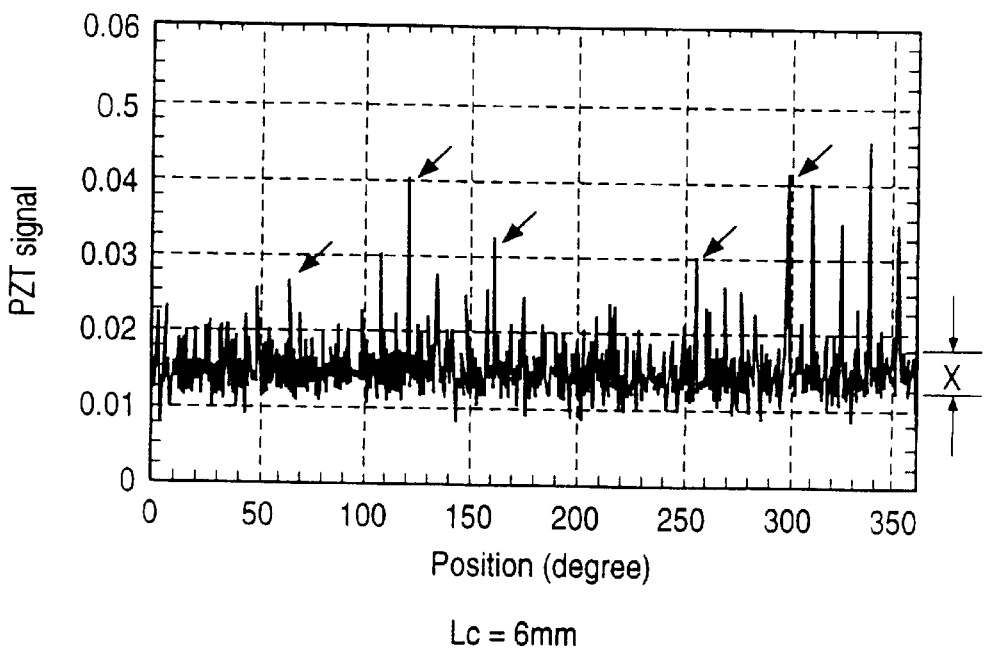
Figure 6C:
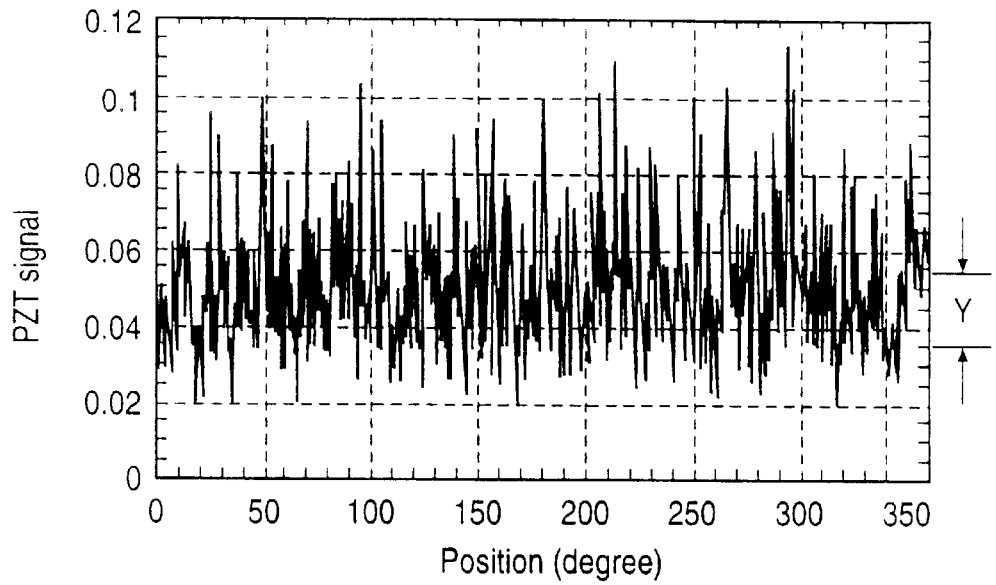

As discussed above, the circumferential distance Lc between bumps (as shown in FIG. 3) has an effect on the PZT output signal. FIGS. 6A, 6B, and 6C are examples of how the distance Lc can affect the PZT output signal of the glide head. The glide head used to generate the graphs shown in FIGS. 6A, 6B, and 6C has a length L of 2 mm. FIG. 6A shows an output signal where the glide head is flying higher than the bump height and thus the glide head produces a PZT output signal with only noise. FIG. 6B shows the PZT output signal of a glide head over a calibration disk with a circumferencial distance Lc of 6 mm between bumps. FIG. 6C shows the PZT output signal of the glide head over a calibration disk with a circumferencial distance Lc of 60 µm. Because of the large distance between bumps in FIG. 6B, the contacts in FIG. 6B occur much less frequently than the contacts in FIG. 6C.

As shown in FIG. 6A, when the glide head is flying over the calibration disk at a height greater than the bump height, there are no contact signals and only noise can be observed. As the fly height of the glide head is decreased below the avalanche point for the band, contact signals appear as spikes, indicated by the arrows in FIG. 6B. As can be seen in FIG. 6B, the amplitudes of the contact spikes are not uniform. Because the circumferencial distance Lc between bumps in FIG. 6B is greater than the length of the glide head, the glide head contacts a single bump at a time. Thus, isolated peaks appear intermittently (above the noise level X). The isolated peaks, however, have amplitudes that are sometimes difficult to detect above the noise level X. Thus, the calibration disk with bumps at a large distance Lc produces a PZT output signal that makes it difficult to determine if a bump was detected. Moreover, the isolated bump will be quickly worn down because it is receiving the full impact of the glide head.

On the other hand, the Lc distance of 60 µm as shown in FIG. 6C ensures that the calibration bumps have a sufficient population to generate an approximately constant contact signal. Thus, the PZT output signal shown in FIG. 6C is consistent and free from irregular signals that could be related to a real defect on the calibration disk. Therefore, not only do the peak signals increase but the noise level Y of the PZT signal is also raised. Consequently, it is easy to generate a consistent average signal from the PZT output signal shown in FIG. 6C, which enables elimination of any abnormal bumps or extrinsic contamination or defects. Signal spikes caused by contamination or abnormal bumps on the calibration disk have little affect on the average signal. The multiple bump configuration also extends the useful life time of the calibration disk because many bumps can support the impact energy of the glide head thereby reducing bump wear.

Figure 7:
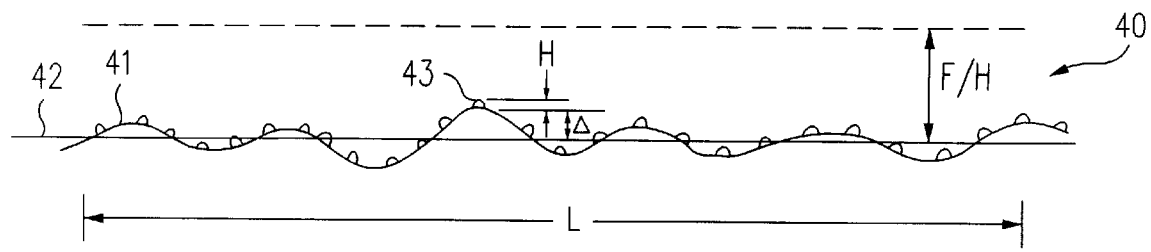
FIG. 7 is a side view of a disk showing surface waviness.

To determine the relationship between the fly height of a glide head and bump height, it is necessary to consider the waviness of the disk. FIG. 7 is a side view of a disk 40 showing a typical disk waviness. As shown in FIG. 7, because of the waviness of the surface 41 of disk 40, surface 41 can deviate from the mean surface height 42 by a large amount, which can effect the effective bump height of a bump on surface 41. For example, where a bump 43 is located at the peak of a wave that deviates from the mean surface height 42 by an amount Δ, the effective bump height of bump 43 is the height of bump 43 plus the amount Δ. Moreover, where the waviness of disk 40 has a wavelength that is less than the length L of the rails of the glide head, as shown in FIG. 7, the glide head cannot follow surface 41. Consequently, the effective bump height relative to the fly height F/H of the glide head is increased by the amplitude Δ of the waviness of surface 41.

Figure 8:
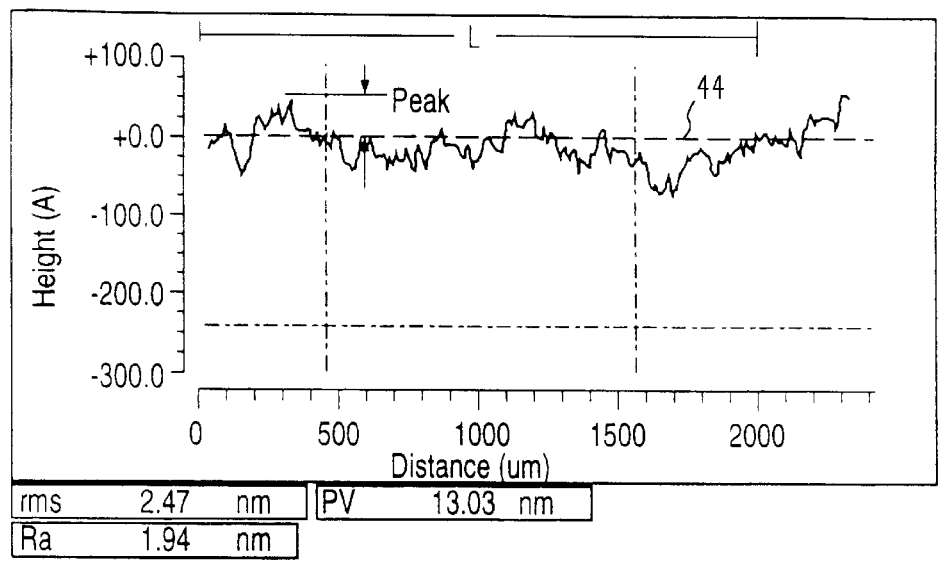
FIG. 8 is a graph showing the surface waviness of a typical magnetic disk.

FIG. 8 is a graph showing the surface waviness of a typical magnetic disk. Within a glide head length L, which is typically 2 mm, the disk surface deviates 10 to 60 Å from the mean surface over which the glide head flies as indicated by dotted line 44.

Figure 9:
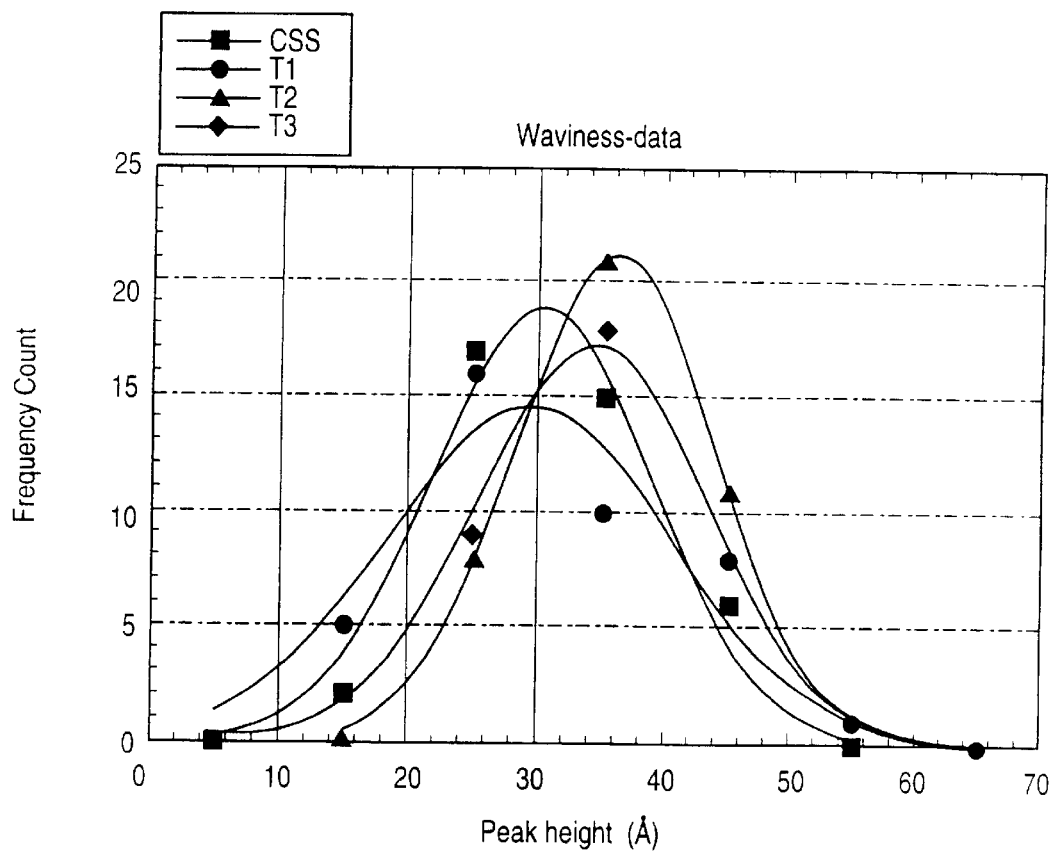
FIG. 9 is a graph showing the distributions of waviness of three bands and the CSS zone on a calibration disk.

FIG. 9 shows distributions of waviness on three bands and the CSS zone on a calibration disk. The Y axis of the graph in FIG. 9 is frequency count, which is the real number of measurements showing a particular peak height (waviness) represented by the X axis. The fly height at which a glide head starts to contact the bumps, i.e., the avalanche point, is raised by an average of approximately 30 Å through 40 Å because of the variations are added to the bump height distribution and waviness.

Clamping distortion is another factor that affects the effective bump height. During calibration, the calibration disk is clamped to a disk spindle (shown in FIG. 11) at the central aperture defined by inside diameter 19 (shown in FIG. 1A) which is usually within twenty-five percent of the disk diameter. To accurately simulate a production magnetic disk and to calibrate the glide head, the calibration disk is ideally flat. Poor clamping of the calibration disk, however, can easily distort the disk flatness and even a small amount of distortion can change the PZT output signals.

Figure 10A:
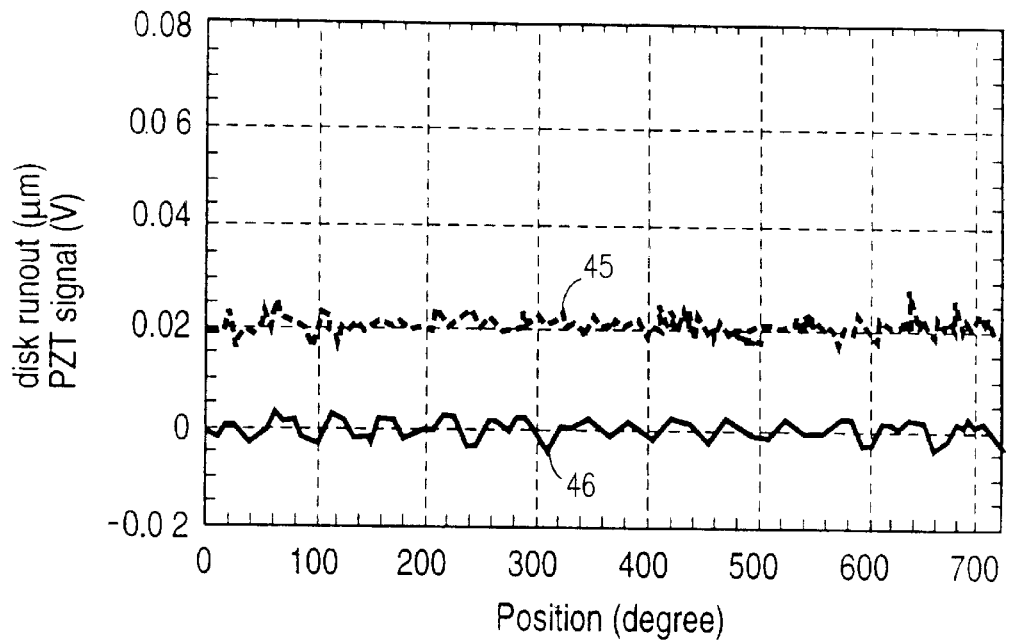
FIGS. 10A and 10B are graphs showing PZT output signals and disk runout in two consecutive revolutions of a calibration disk, with no clamping distortions and with clamping distortions, respectively.
Figure 10B:
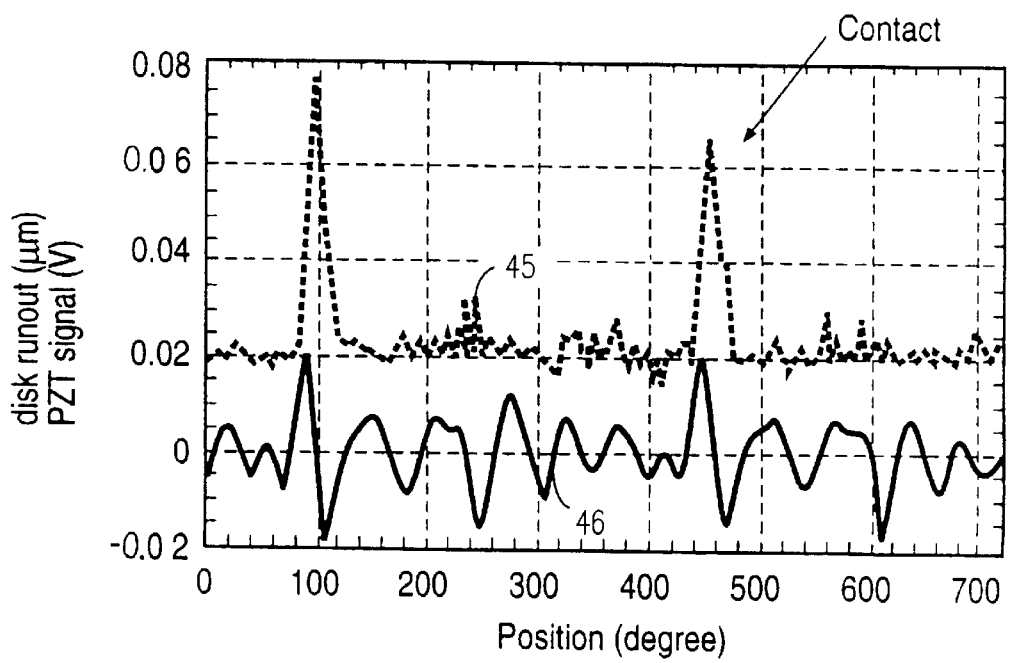

Runout, which is deviation from a level surface, can be used to show the effect of disk deformation caused by poor clamping conditions. FIGS. 10A and 10B are graphs showing disk runout 46 and its effect on the PZT output signal 45 where the disk is under good clamping conditions and poor clamping conditions, respectively. The X axis in FIGS. 10A and 10B show the position in degrees on the disk, while the Y axis shows both the disk runout in 0.02 $\mu$m increments and the PZT signal in 0.02 V increments. In FIGS. 10A and 10B the exact same combination of disk and glide head were used, and only the clamping conditions were changed. The disk speed used in both FIGS. 10A and 10B are the same and thus, the glide head fly height is the same. As can be seen in FIG. 10A, under good clamping conditions there is very little runout and the PZT output signal indicates no contact. However, under poor clamping conditions, as shown in FIG. 10B, distortions generate a large runout which has associated high PZT contact signals. Thus, bumps on the calibration bump should be located in an area that is not affected by clamping conditions. This can be accomplished by placing the inner most band, i.e., band 1 (shown in FIG. 1A) at a radius that is greater than thirty percent of the disk diameter. Further, the 15 runout of the calibration disk should be maintained within approximately 5 $\mu$m at inside diameter 19.

Figure 11:
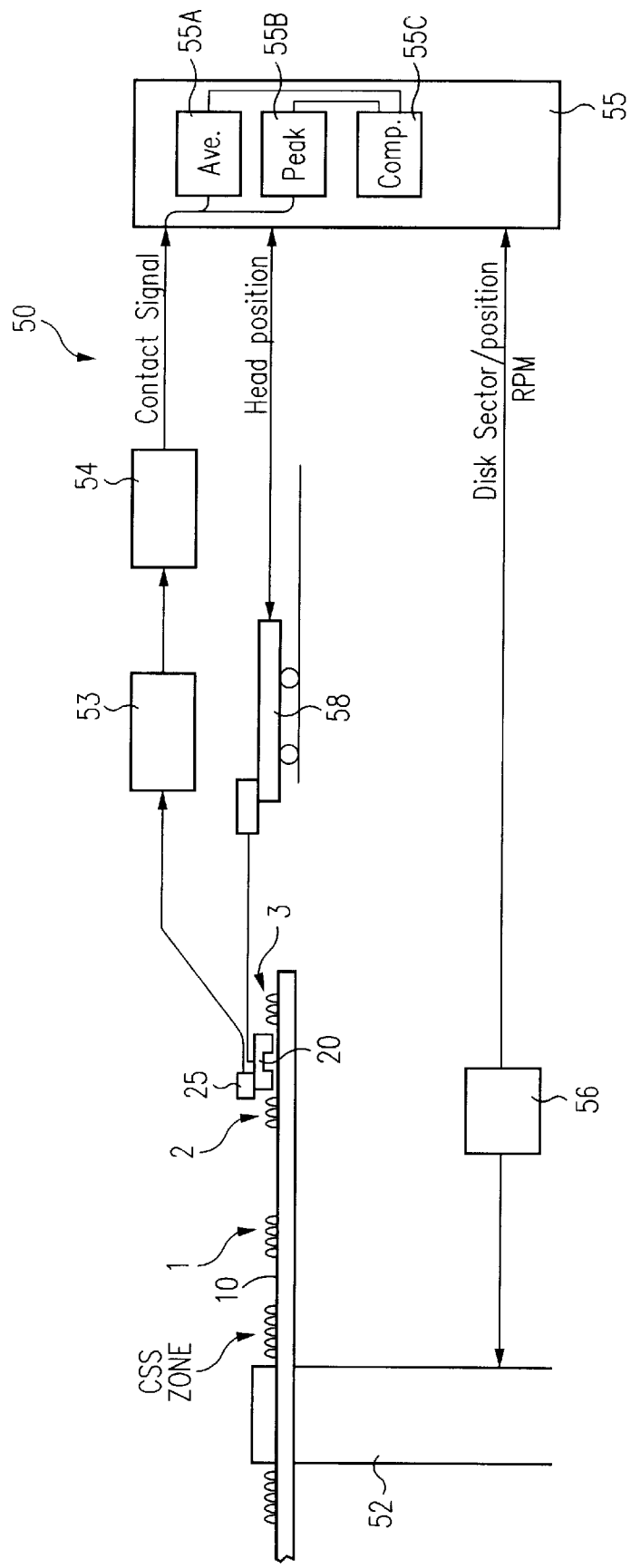
FIG. 11 is a schematic view of a glide tester system.

FIG. 11 shows a schematic view of a glide tester 50 that uses calibration disk 10. Glide tester 50 may be, by way of an example, a model MG250 glide tester manufactured by Phasemetrics, Inc. located in Fremont, Calif. Calibration disk 10 is mounted on a disk drive spindle 52. Glide head 20 flies (is positioned) over the various bands 1, 2, and 3 by operation of an actuator 58 controlled by a controller 55. The PZT sensor 25 is connected to a PZT amplifier 53, which is connected to a data acquisition module 54 for transferring a contact signal from PZT sensor 25 to controller 25. The contact signal from PZT sensor 25 is an analog signal that is processed by average circuitry 55A and peak circuitry 55B to determine the respective average level and peak level of the contact signal. The average level and contact signal is then compared with the peak level at a comparator circuitry 55C to determine whether glide head 20 contacted a bump. The average level may be determined through a root mean square analysis or any other appropriate manner.

The position of actuator 58 is inputted into controller 55. An index/position sensor 56 senses the position of glide head 20 relative to calibration disk 10 and inputs that position along with the rotational speed of the calibration disk to controller 55. From this information, the linear velocity of glide head 20 relative to calibration disk 10 may be determined. Controller 55 produces an output signal that corresponds to the contact signal and the location of glide head 20 over calibration disk 10.

During testing and calibration it is desirable to eliminate any contamination on glide head 20. One method of removing contamination from glide head 20 is to exercise a contact start and stop (CSS) on CSS zone. For this purpose a slightly roughened disk surface, such as mechanical texture, is effective. Therefore a laser zone texture CSS area can be replaced by a mechanically textured CSS zone as is well known in the art.

Calibration disk 10 may be used, in conjunction with a fly height tester, to accurately calibrate a glide head. The glide head is flown over a band on the calibration disk to obtain an avalanche curve. From the avalanche curve, the linear speed at which contact with the bumps first occurs can be determined. It should be understood that the actual magnetic heads may similarly be calibrated with calibration disk 10 so as to assure the real fly height of the magnetic heads.

Figure 12:
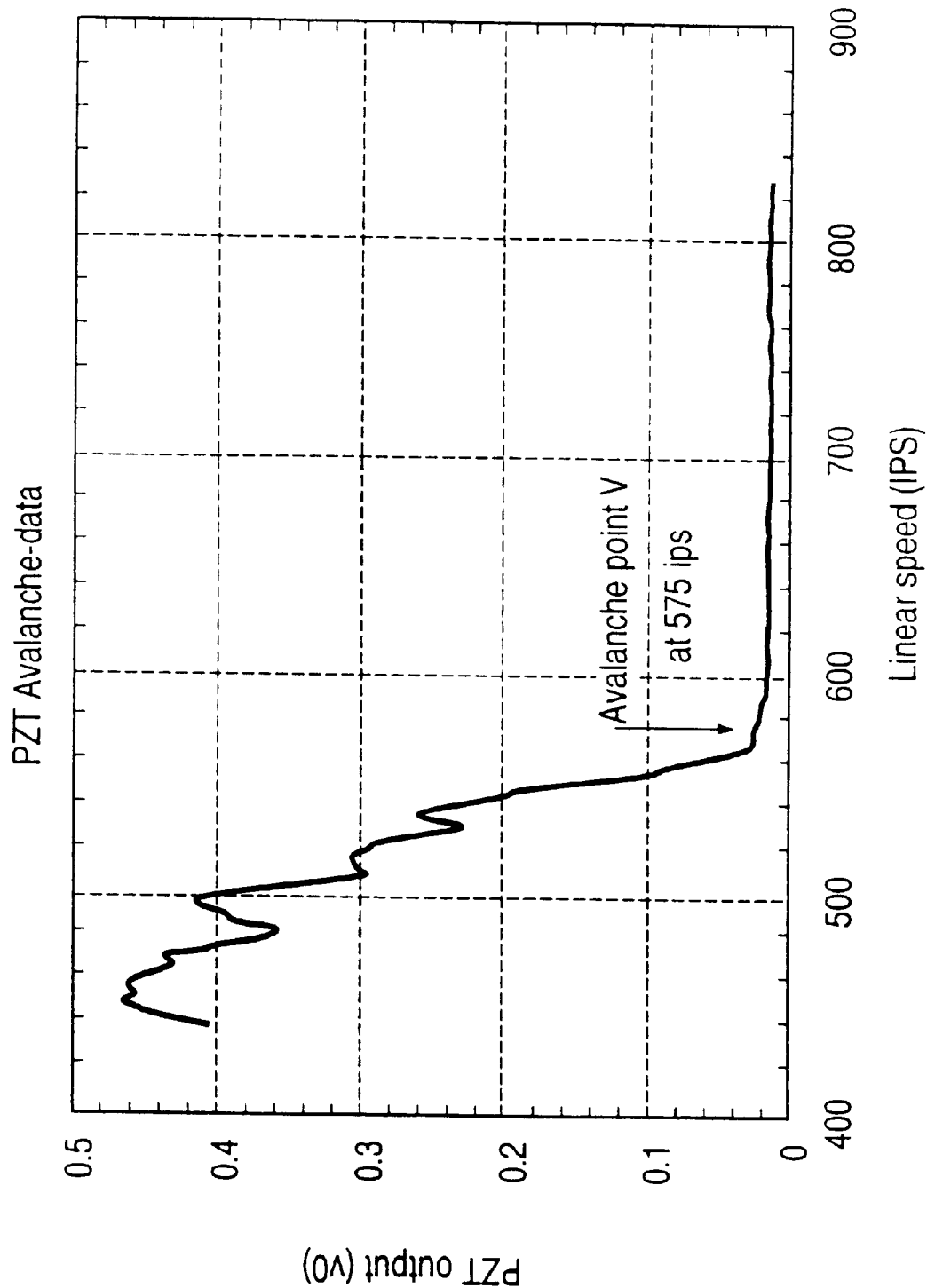
FIG. 12 is a graph of an avalanche curve generated by a PZT output signal as a function of disk linear speed.

FIG. 12 is an example of an avalanche curve generated by a PZT output signal as a function of disk speed in inches per second (ips). To produce an avalanche curve the linear speed of the disk is reduced from high to low while the glide head is flying over the disk and while monitoring the PZT signal. As indicated in FIG. 12, at speed V, approximately 575 ips, the PZT signal starts to rise from the noise floor. The point at which the PZT signal starts to rise is the avalanche point. The avalanche point is defined as the highest linear velocity at which there is contact between the disk and the glide head. The noise floor is the amplitude of the output signal without any contact and consists of noise of the electrical circuits such as the pre and main amplifier, as well as non-contact noise, such as slider vibration. Below the avalanche point, a typical glide head cannot sustain a no-contact condition because the bump height or peaks on the surface of the disk are higher than the fly height of the glide head.

Using a conventional fly height tester, the linear speed V at which the avalanche point occurred can be converted into a fly height. Avalanche points and bump heights have a linear relationship. Therefore, if one knows the fly height at the avalanche point, one can estimate the bump height. A fly height tester is available from Phasemetrics. For more information related to fly height testers see the Phasemetrics DFHT Manual 30, 150 Rev. D Nov. 1, 1994.

Figure 13:
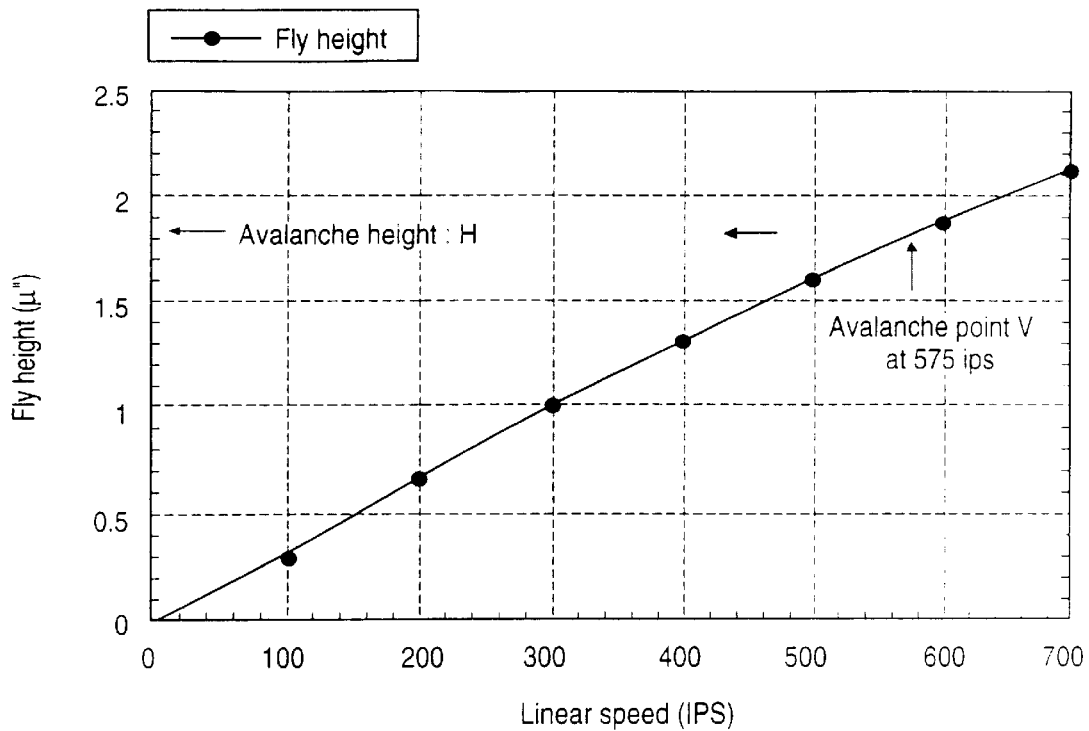
FIG. 13 is a graph of a fly height measurement taken from a conventional fly height tester showing the relation between disk linear speed and fly height of the glide head.

FIG. 13 shows the fly height measurement of the glide head taken from a conventional fly height tester to be used in conjunction with FIG. 12. A conventional fly height tester such as the Phasemetrics DFHT gives a single measurement point for a given speed condition. The fly height measurements shown in FIG. 13 are used to convert the speed V into the fly height of the glide head at which the avalanche point occurred. As shown in FIG. 13, the speed V is equivalent to an approximate fly height of 1.8$\mu$" (microinches) for the glide head.

Figure 14:
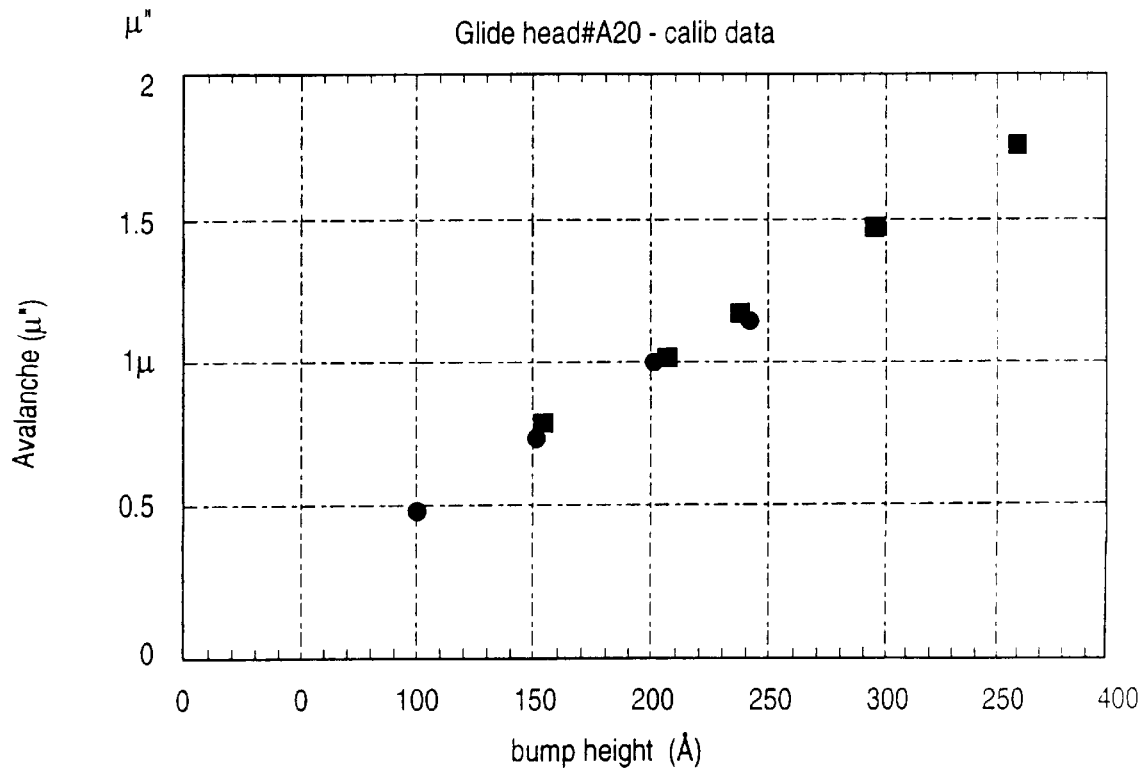
FIG. 14 is a graph showing a relationship between bump height and avalanche point.

FIG. 14 is a graph showing the correlation between the fly height at the avalanche point and the bump height for two different glide heads. The data shown in FIG. 14 were produced by the method described above. The position of the glide head was changed band by band on the calibration disk to obtain an avalanche curve for each band, similar to that shown in FIG. 12. The avalanche curves were then converted using a fly height measurement as shown in FIG. 13. Thus, a correction factor that is the difference between the actual bump height and the fly height at which the avalanche point occurred can be obtained.

Consequently, calibration disk 10 can be used to accurately calibrate a glide head using a contact signal generated by the lowest point on the glide head. The configuration of calibration disk 10 advantageously reduces errors generated by disk waviness, runout, and variances caused by the difference in the glide tester and the fly height tester.

However, to obtain the fly height measurement as described in reference to FIG. 13, the glide head had to be tested on the fly height tester. Once the fly height measurement is taken, the glide head is mounted on the glide tester to generate the avalanche curve shown in FIG. 12. Because each glide head must be independently tested on the fly height tester, the calibration procedure can be time consuming. However, the use of a fly height tester can be avoided according to another embodiment of the present invention.

Calibration disk 10, can be used to calibrate a glide head while the glide head is on the glide tester by identifying the output signal generated by the lowest point on the glide head contacting calibration disk 10. There is no need to obtain an independent fly height measurement of the glide head on a separate fly height tester before mounting the glide head on the glide tester. Calibrating the glide head while it is mounted on the glide tester simplifies calibration and advantageously eliminates variances caused by the difference between the glide tester and the fly height tester, such as Z height, skew, mount flatness, and disk parameters (surface texture, waviness, and runout). To calibrate a glide head with calibration disk 10 without using a fly height tester, the following procedure is followed:

The glide head is mounted on a glide tester, such as a model MG250 manufactured by Phasemetrics. Calibration disk 10 is mounted on the spindle of the glide tester. Avalanche curves are generated for a plurality of the bands on calibration disk 10. The linear velocity at the avalanche point is recorded. Because the heights of the bumps in each band is known, a correlation between the bump heights and the linear velocity at the avalanche points can be obtained. From this correlation, the appropriate linear velocity for a specific height can be determined for the calibrated glide head.

When using an avalanche curve, however, it is necessary to ensure that the lowest point on the glide head is over the band of bumps. One way to ensure that the lowest point on the glide head is over the band of bumps is for the bands on calibration disk 10 to be wider than the total width of the glide head and then to ensure that the glide head is approximately in the center of the band.

In another embodiment, radial scans are performed over the individual bands of calibration disk 10 to obtain the constant linear velocity (CLV) at which the glide head generates a specific average output signal, such as 0.1 volt (V), known as 0.1V CLV.

Figure 15:
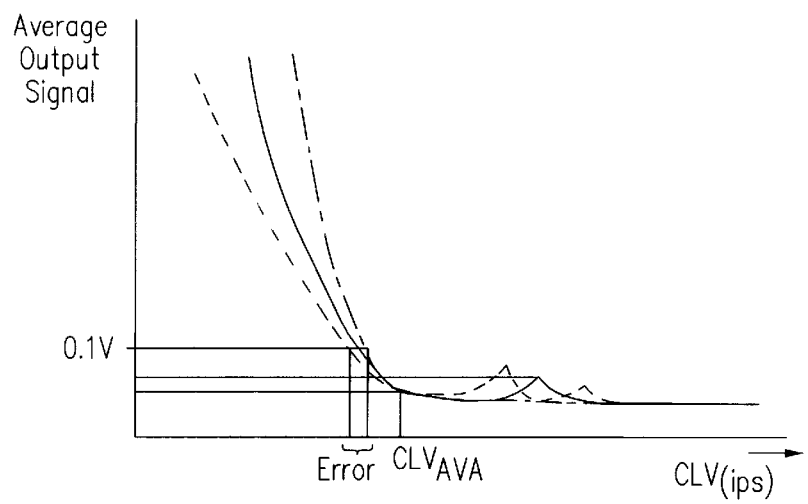
FIG. 15 is a graph showing three avalanche curves for three different glide heads illustrating the resonance effect and differing sensitivities of the glide heads.

An average output signal of 0.1V is chosen because each glide head may have a different sensitivity to resonance caused by the spacing of the bumps combined with the velocity, which affect the output signal of each head. FIG. 15 is a graph showing three avalanche curves for three different glide heads illustrating the resonance effect and differing sensitivities of the glide heads. The avalanche curves have an avalanche point at $CLV_{AVA}$. As can be seen in FIG. 15, at a CLV greater than $CLV_{AVA}$, each avalanche curve may have an increase in the average output signal, however the CLV at which this increase occurs along with the amplitude of the increase may differ for each glide head. This increase is not caused by physical contact but is caused by the resonance effect. Moreover, as can be seen in FIG. 15, as the CLV is decreased from $CLV_{AVA}$ the output signals of the different glide heads increase at a different rate, i.e., the output signals have different slopes. The different rate of increase is caused by the differing sensitivities of the glide heads. Thus, a 0.1V CLV is chosen so as to minimize the error caused by the differing sensitivities of the glide heads as well as to ensure that the output signal caused by the resonance effect is avoided. If the resonance effect can be canceled, e.g., by sufficiently randomizing the distance between bumps on calibration disk 10, and there is little base noise level an output signal lower than 0.1V may be used. Optimally, the output signal at the avalanche point would be used, however, this is limited in practice by noise and the resonance effects. Of course, any specific output signal may be used if desired, however, with output signals greater than 0.1V CLV, the error caused by the differing slopes of the curves is increased.

Different output voltage levels for different bands may be used if necessary to compensate for the base noise level. Where a particular band has a high noise level, for example, when the bump height of the band is high, an output signal may be used that is greater than the output signal used with the other bands. The data can then be normalized to keep the output signal versus linear curve linear. However, compensating for base noise level is undesirable, and may be easily avoided by using bands with approximately the same base noise levels.

The radial scans are performed by sweeping the entire glide head, i.e., both rails of the glide head, over the entire width of a band on calibration disk 10 and observing the output signal. The linear velocity of calibration disk 10 is adjusted and the glide head is again swept over the entire width of the band. This process is continued until the appropriate linear velocity is found that will generate the desired peak average output signal, e.g., 0.1V CLV, for the specific band on calibration disk 10. This process is performed for a plurality of bands on calibration disk 10.

Figure 16:
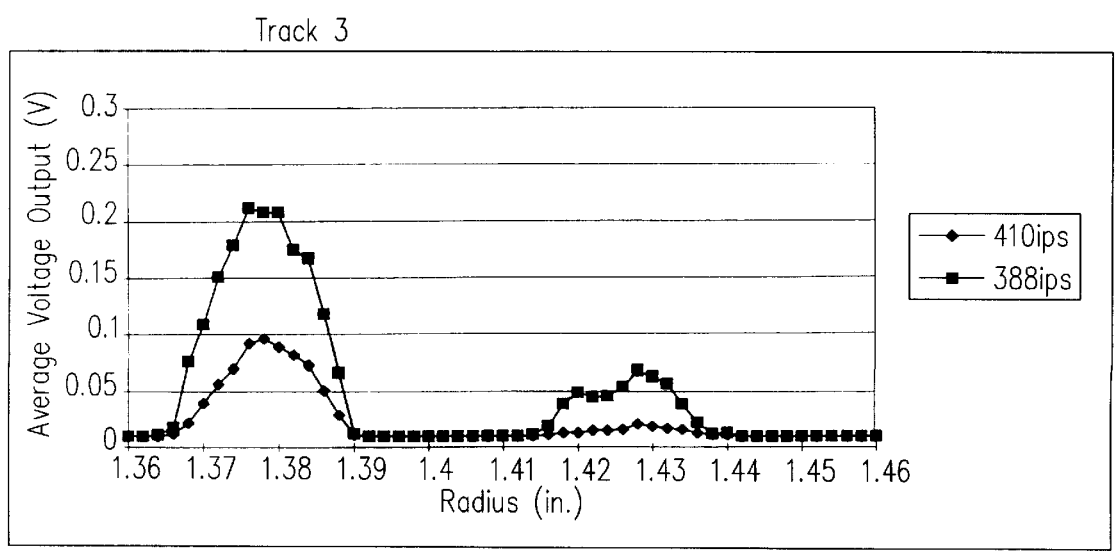
FIG. 16 is a graph showing a radial scan performed at different CLVs on track 3 of a calibration disk.

FIG. 16 is a graph of a radial scan of track 3 of a calibration disk performed at two different CLVs, i.e., 410 ips and 388 ips. The Y axis in the graph of FIG. 16 is the average output voltage and the X axis is the disk radius in inches. As shown in FIG. 16, the radial scan of the calibration disk generates two peaks corresponding to each rail of the glide head passing over the band of bumps in track 3. The CLV used for the radial scan is adjusted until the highest output signal for both rails of the glide head produces a 0.1V average output signal peak, i.e., at a CLV of 410 ips, as shown in FIG. 16. Of course, if desired a single rail glide head may be used.

Figures 17A, 17B:
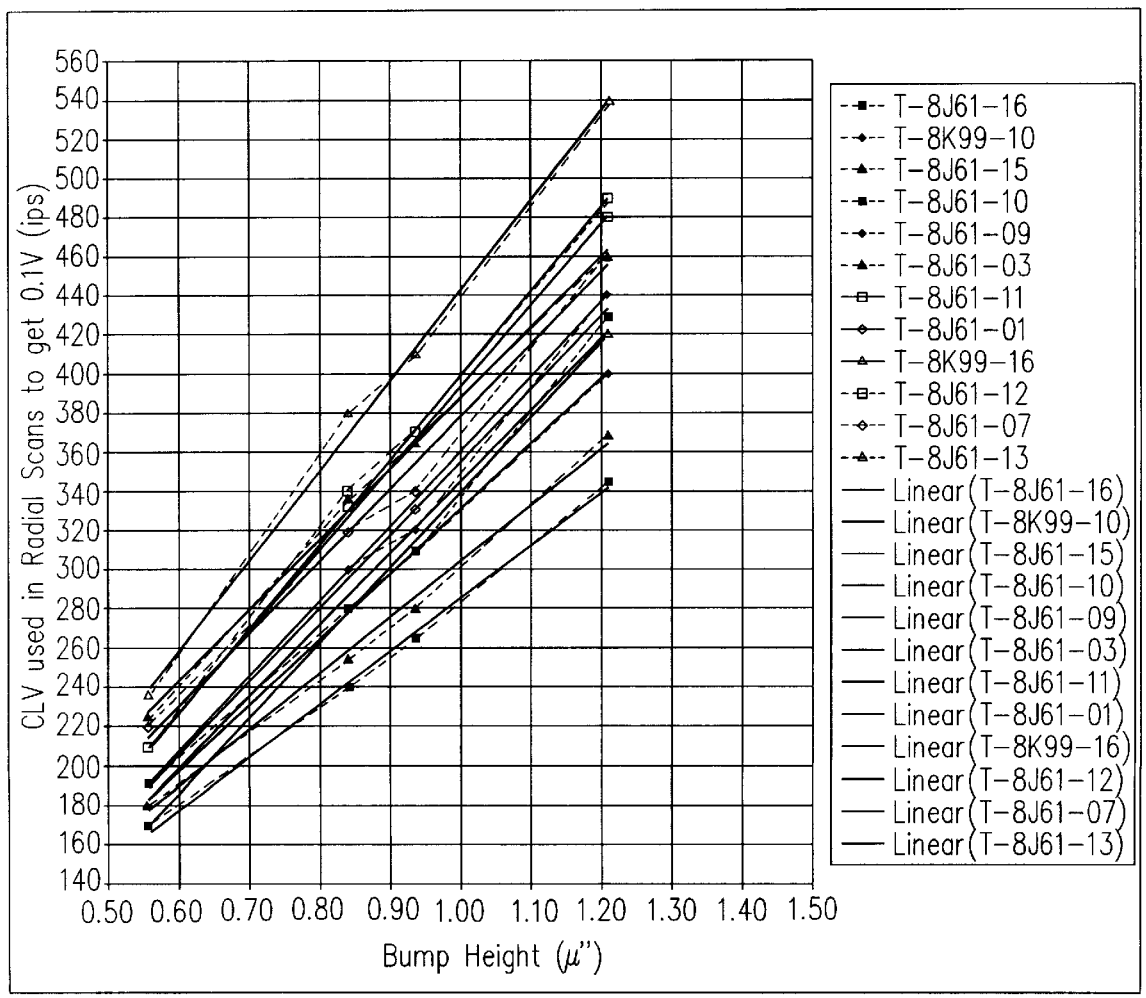
FIGS. 17A and 17B are a respective table and graph of data relating disk linear velocity to bump height for a 0.1V output signal from twelve glide heads over four different bump heights.

FIGS. 17A and 17B show in tabular and graphical form, respectively, an example of obtaining a 0.1V CLV for twelve different glide heads. As can seen in FIGS. 17A and 17B, the 0.1V CLV is determined for four bands, each with a different bump height. FIG. 17B is a graph showing the 0.1V CLV in ips, i.e., the CLV used in a radial scan to generate a 0.1V average output signal, relative to the bump heights for the different bands on a calibration disk. The actual bump heights for each band on the calibration disk are known as they are precisely measured using, for example, atomic force microscope or an interferometric optical microscope. The bump heights of the four bands on the calibration disk used to generate the tabular and graphical data shown in FIGS. 17A and 17B are 1.21, 0.93, 0.85, and 0.56 microinches ($\mu''$). It should be understood that the use of four bands to calibrate a glide head as shown in FIGS. 17A and 17B is illustrative and that additional or fewer bands may be used if desired, as long as two or more bands are used to generate lines with slope and offset.

The information obtained in FIGS. 17A and 17b may be used to calibrate the glide head with respect to bump heights. Thus, once the data shown in FIGS. 17A and 17B is obtained, the slopes and constants describing the CLV to bump height relation may be obtained using, e.g., linear regression. Thus, the CLV required for a glide head to detect an asperity of a particular height on the production disk may be determined.

However, the industry standard relates the velocity of the glide head to the fly height of the glide head. Where calibration of the glide head with respect to fly height is desired, the data shown in FIGS. 17A and 17B can be converted to relate the CLV to fly height with the use of a conversion factor. Thus, the information shown in FIGS. 17A and 17B relating the 0.1V CLV to the calibration bump heights is converted to relate the 0.1V CLV to the fly height of the glide head, known as 0.1V Fly Height. The use of a conversion factor to convert the bump height to a 0.1V Fly Height obviates the use of a fly height tester. The conversion factor is generated in the following way.

Figure 18:
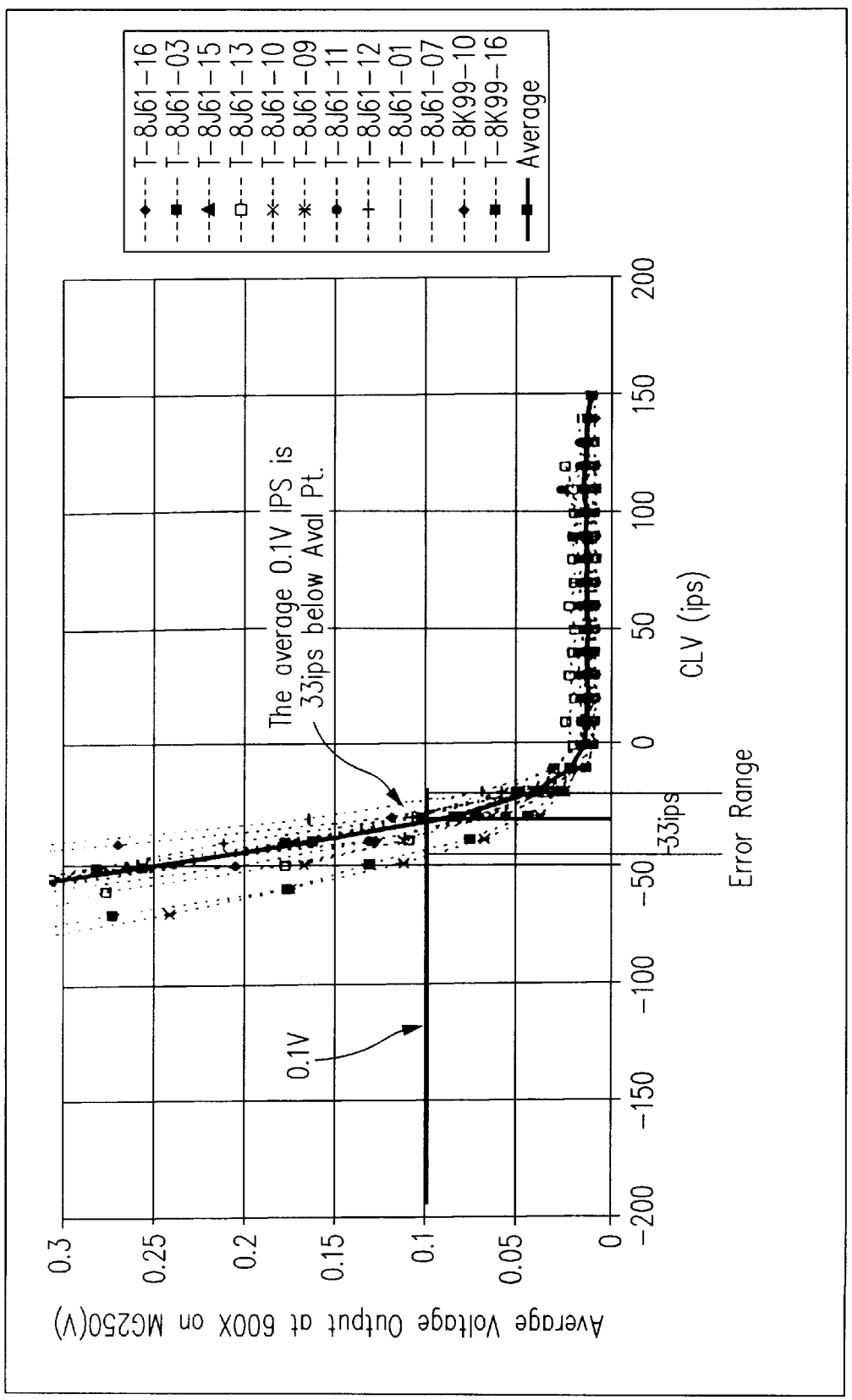
FIG. 18 is a graph of avalanche curves aligned by avalanche point to obtain the average linear velocity for producing a 0.1V output signal.

The average CLV difference between the avalanche point and the 0.1V CLV is determined. To determine the average CLV difference, avalanche curves from several glide heads over a band on the calibration disk are aligned by avalanche points. FIG. 18 shows the avalanche curves for twelve glide heads over a band of the calibration disk, which has a bump height of $0.85\mu"$. The avalanche curves are aligned so that the avalanche points are at zero. Thus, the X axis of the graph in FIG. 18 shows the CLV in ips with the avalanche points set at zero and the Y axis is the average output voltage of the twelve glide heads. The avalanche curves for the twelve glide heads are then averaged to form one averaged avalanche curve. Using the averaged avalanche curve, the average CLV required to generate an output signal of 0.1V, known as 0.1V IPS, is determined. As can be seen in FIG. 18, the average 0.1V IPS is 33 ips below the average avalanche point. FIG. 18 also shows the error range of the glide heads at 0.1V. As can be seen, the error range at 0.1V is much smaller than the error range if an output voltage of 0.25V were used because of the diverging slopes, by way of an example. It should be appreciated that the difference of 33 ips is determined experimentally, and that including additional glide heads and different height bands of bumps will produce a more accurate average and difference determination. Further, the difference of 33 ips was determined for a 50% glide head. Where different size glide heads are used, the difference between averaged avalanche point and 0.1V IPS will probably change.

Figure 19:
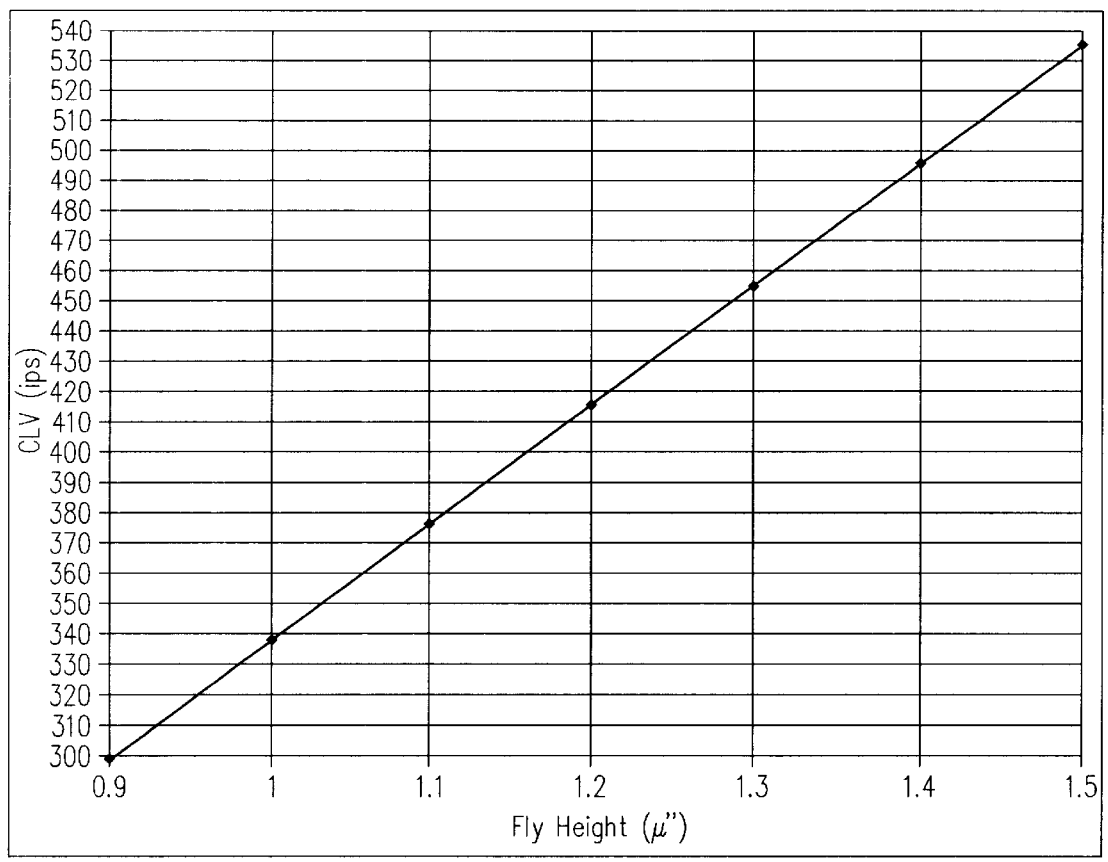
FIG. 19 is a graph of the average relationship between fly height and linear velocity for 5000 glide heads.

The average fly height relative to CLV is determined for a large sampling of glide heads in a conventional manner, i.e., through the use of a fly height tester. FIG. 19 is a graph showing the average curve relating fly height in $\mu"$ to CLV in ips for 5000 glide heads. The graph of FIG. 19 was generated by testing the CLV for each glide head at $0.1\mu"$ increments using a conventional fly height tester and then averaging the results. The slope of the average fly height versus CLV is 39 ips per 0.1". Using the average fly height curve for 5000 glide heads shown in FIG. 19, the average 0.1V IPS of FIG. 18 can be converted to an average 0.1V Fly Height. Thus, the average 0.1V IPS of 33 ips below the average avalanche point is the same as an average 0.1V Fly Height of approximately $0.09\mu"$ below the average avalanche point.

Figure 26A:
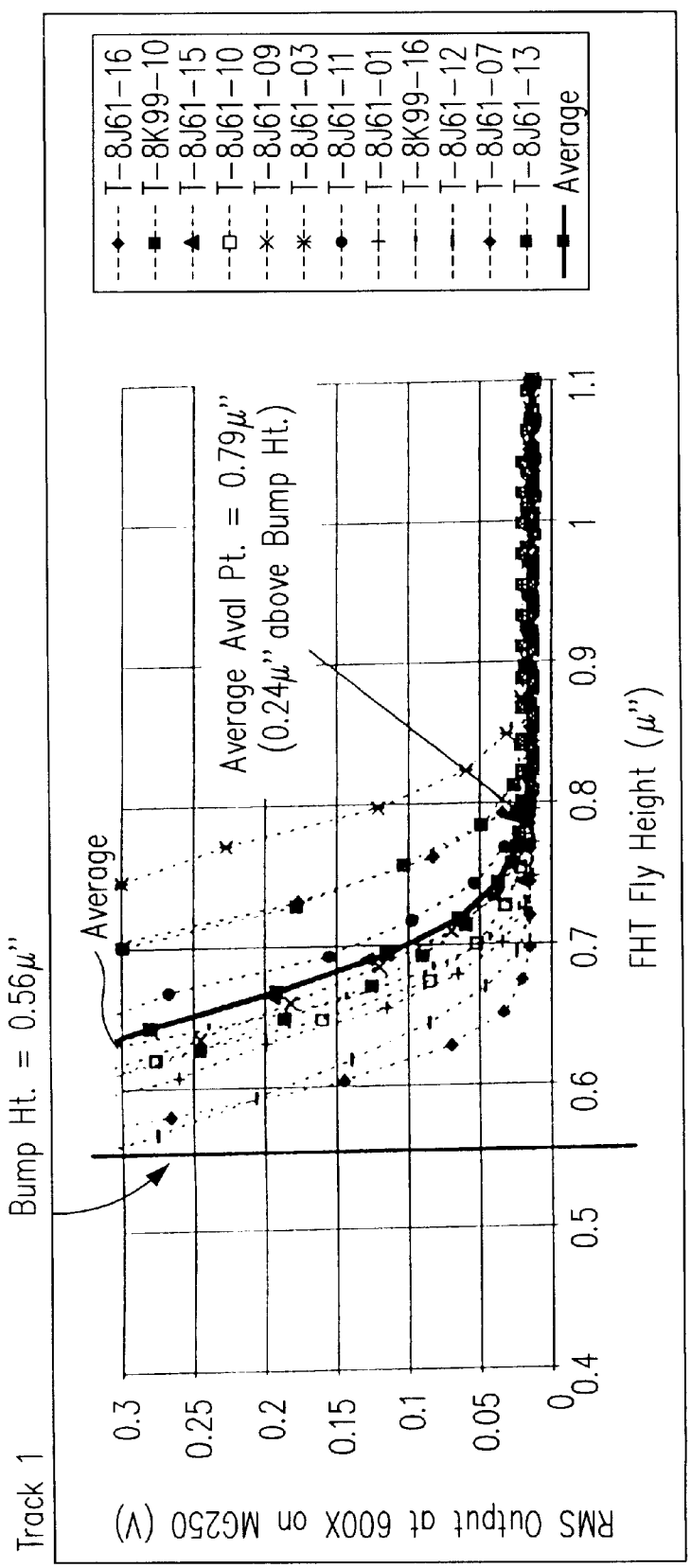
FIGS. 26A, 26B, and 26C are graphs showing avalanche curves relating the output signals from the twelve glide heads to the fly heights of the glide heads as determined by a conventional fly height tester.
Figure 26B:
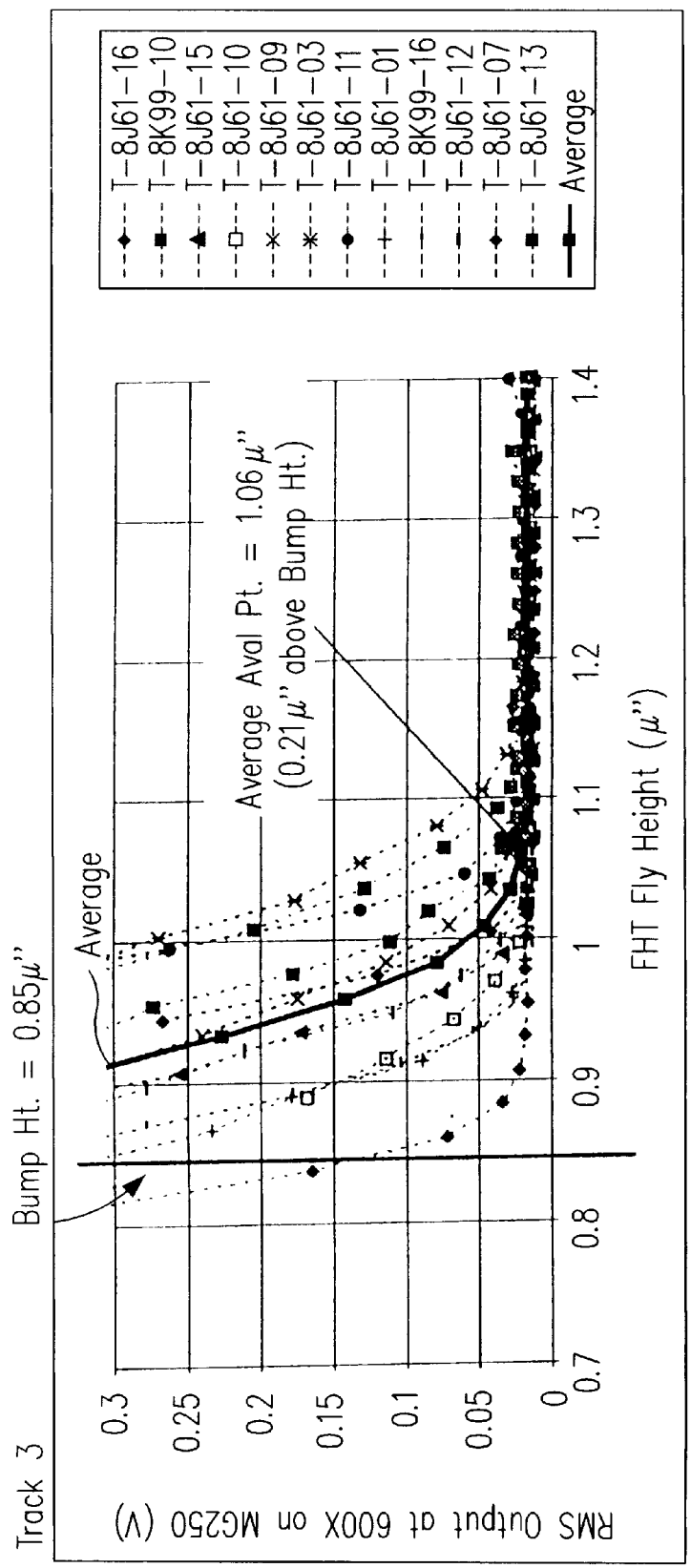
Figure 26C:
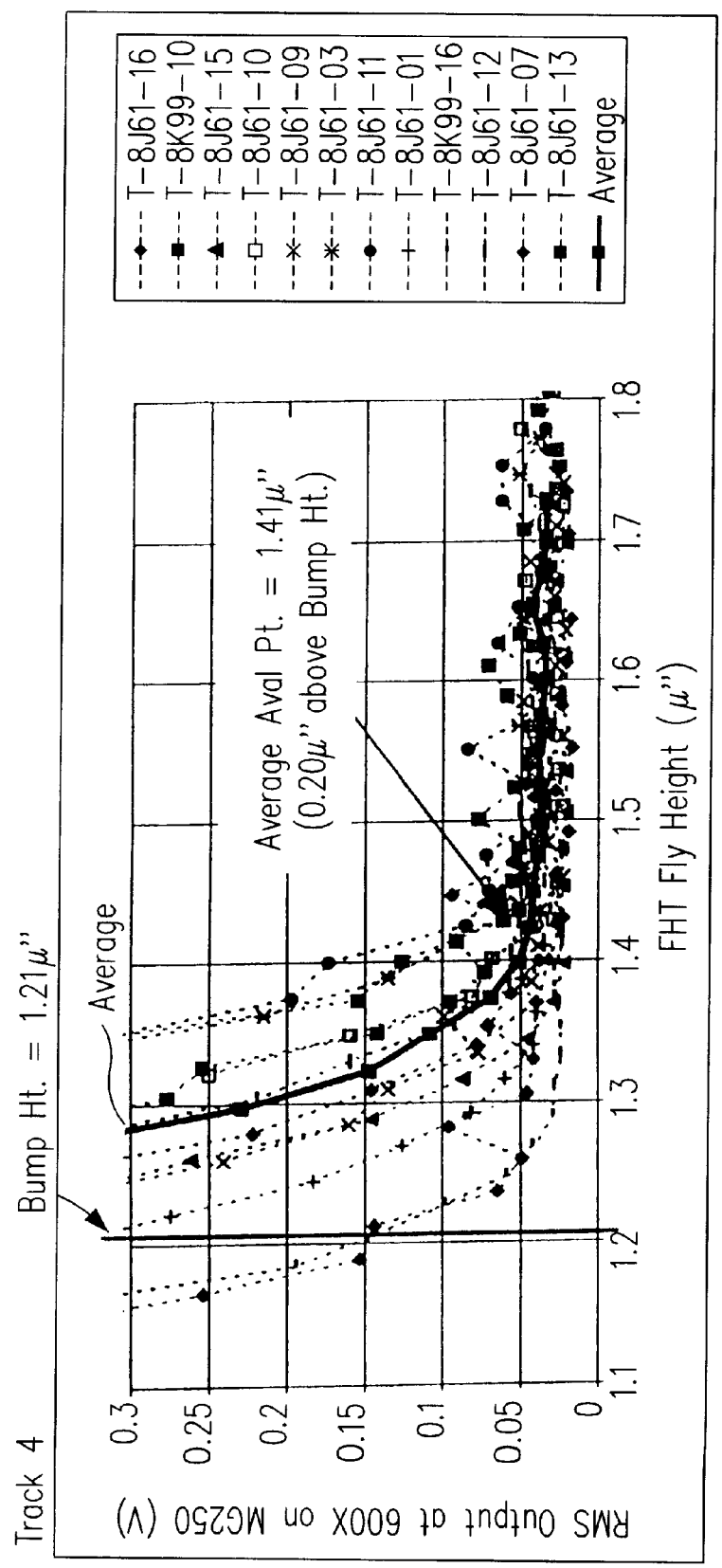

In addition, the average difference between the bump height and the avalanche point is determined. This is accomplished by generating avalanche curves for several glide heads, relating fly height to output signals for several glide heads, as shown in FIGS. 26A, 26B, and 26C. By averaging the avalanche curves for all the glide heads, the average avalanche point can be determined in terms of fly height of the glide heads. The height of the bumps are already known and, thus, the difference between the bump height and the average avalanche point can be determined. It has been determined that the average difference is $0.22\mu"$. Again, it should be appreciated that by including additional glide heads and different height bands of bumps will produce a more accurate average difference determination.

Figure 20:
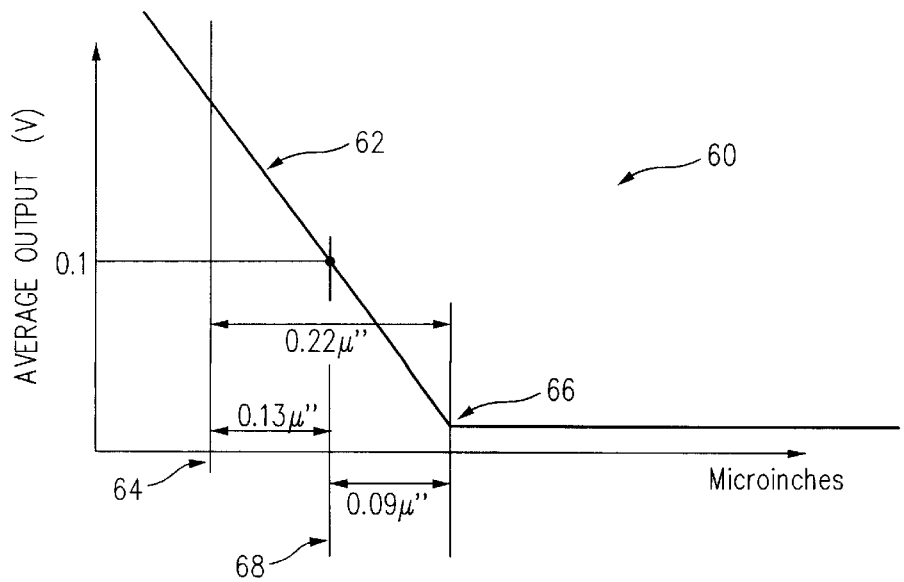
FIG. 20 is a graph of a model avalanche curve for a glide head to convert bump height to 0.1V Fly Height.

FIG. 20 shows a graph 60 of a model avalanche curve 62 relating the average output signal in volts to the fly height in $\mu"$ for a glide head. Also shown in graph 60 is the calibration bump height 64, which is a known quantity. From FIGS. 18 and 19, it is known that the average avalanche point 66 is $0.09\mu"$ above the 0.1V Fly Height 68. In addition, it is known that average avalanche point 66 is $0.22\mu"$ above the calibration bump height 64. Thus, the 0.1V Fly Height may be expressed according to the following.

$$0.1\text{V Fly Height} = \text{Bump Ht.} + 0.22\mu" - 0.09\mu" = \text{Bump Ht.} + 0.13\mu" \qquad \text{equ. 1}$$

Consequently, the fly height of a glide head when it is generating a 0.1V output signal over any band on the calibration disk is equal to the bump height for that band plus $0.13\mu"$. Thus, the conversion factor to convert the calibration bump height ($\mu"$) to 0.1V Fly Height ($\mu"$) is equal to the bump height plus $0.13\mu"$.

It should be understood that the above conversion factor is accurate for the current generation of glide heads and calibration disks. If the flying parameters of glide heads change in the future, or the calibration disks are improved, e.g., in terms of waviness, runout and clamping methods, a new conversion factor may need to be determined in a manner similar to that described above.

Figures 21A, 21B:
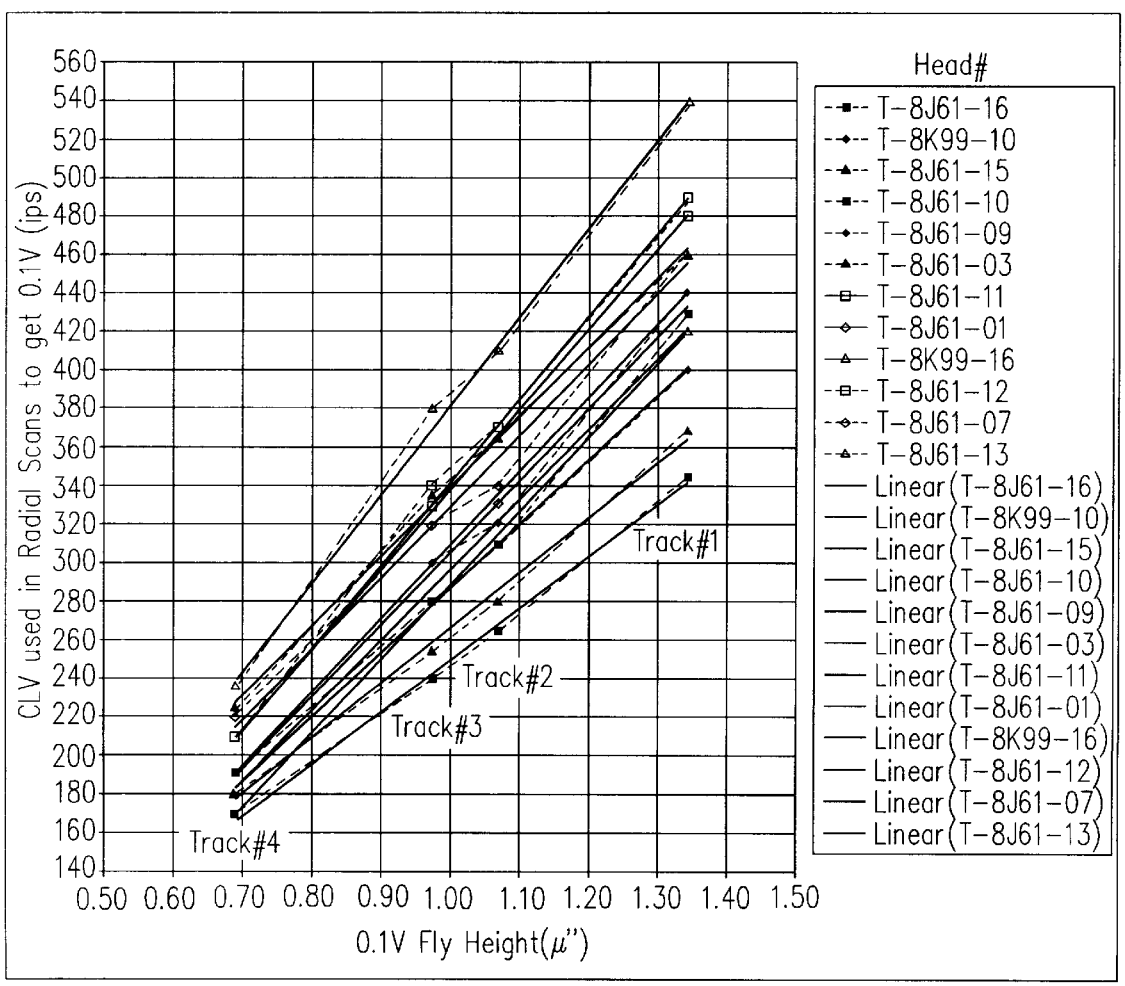
FIGS. 21A and 21B are a table and a graph of the data shown in FIGS. 17A and 17B converted into a relationship between linear velocity and 0.1V Fly Height.

Using the above conversion factor, the information shown in FIGS. 17A and 17B relating the 0.1V CLV to the calibration bump height can be converted so that the 0.1V CLV is related to the 0.1V Fly Height of each glide head as shown in FIG. 21A and 21B. Thus, the graph in FIG. 21B is the same as the graph in FIG. 17B with the curves shifted by $0.13\mu"$. With the 0.1V CLV versus 0.1V Fly Height curves for each glide head established, the CLV (ips) to fly height ($\mu"$) conversion for the individual glide heads can be determined using a curve fit approximation. As shown in FIG. 21B, the 0.1V CLV versus 0.1V Fly Height curves are approximately linear and thus may be described using linear regression. While FIGS. 21A and 21B use four bands to calibrate a glide head, it should be understood that this number is illustrative and that additional or fewer bands may be used if desired, as long as more than one band.

FIG. 22 is a table showing the slopes and constants describing the 0.1V IPS to 0.1V Fly Height curves for each of the twelve glide heads in FIGS. 21A and 21B.

Thus, any glide head can be calibrated on a glide tester using a calibration disk having discrete bands of calibration bumps. Once the glide head to be calibrated is mounted on the glide tester along with the calibration disk, a radial scan is performed for individual bands to determine the 0.1V CLV for the glide head relative to the bump height for each band. Using the conversion factor from equation 1, the 0.1V CLV to bump height data can be converted to relate 0.1V CLV to 0.1V Fly Height. The converted data then can be used to establish the CLV (ips) to fly height ($\mu"$) conversion for the glide head being calibrated. Thus, no independent fly height test on the glide head is required. The calibration disk is then removed and a production magnetic disk can be tested at the appropriate CLV for the glide head being used.

Figure 23A:
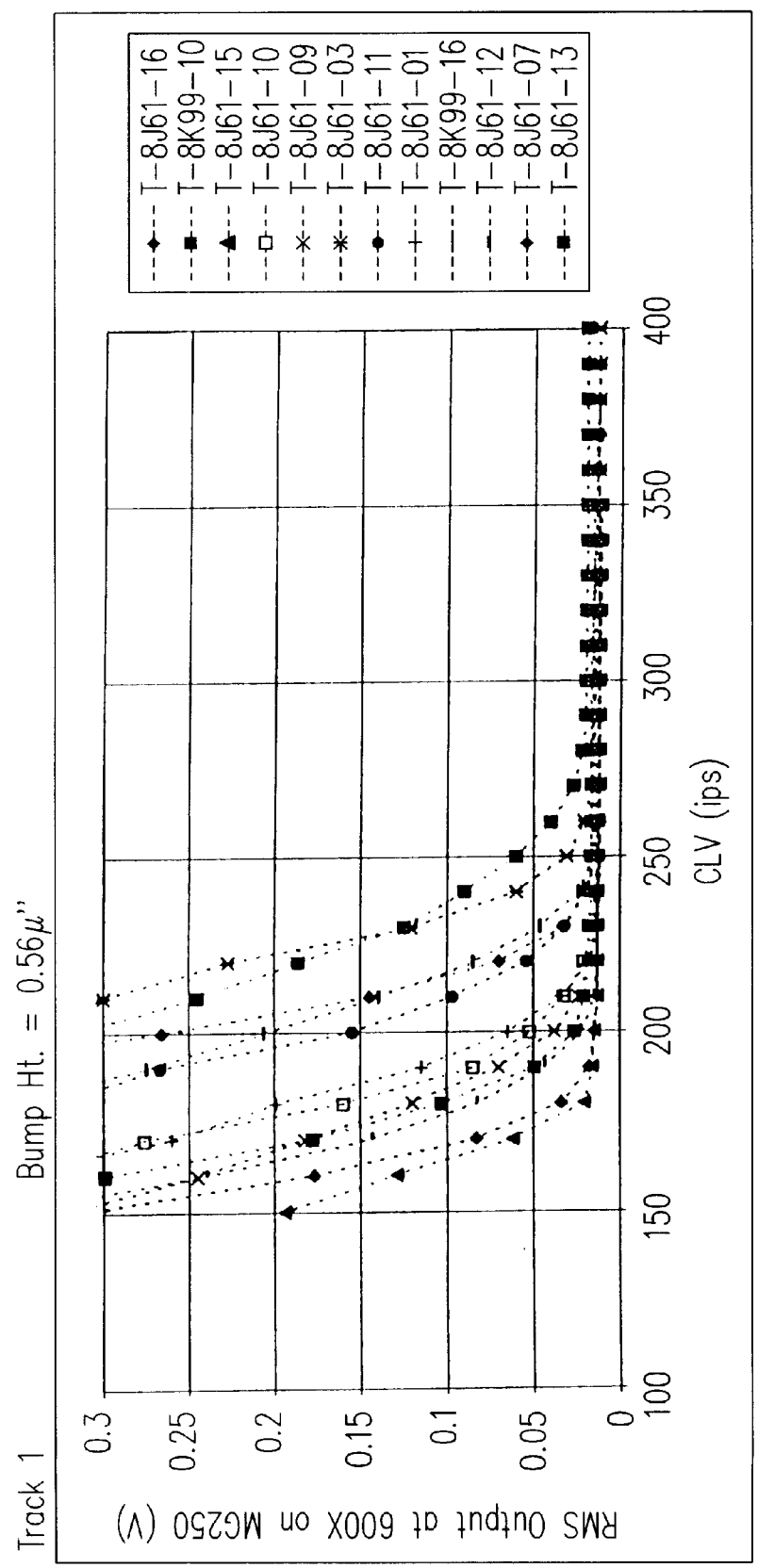
FIGS. 23A, 23B, and 23C are graphs showing avalanche curves relating the output signals from twelve glide heads to the disk linear velocity.
Figure 23B:
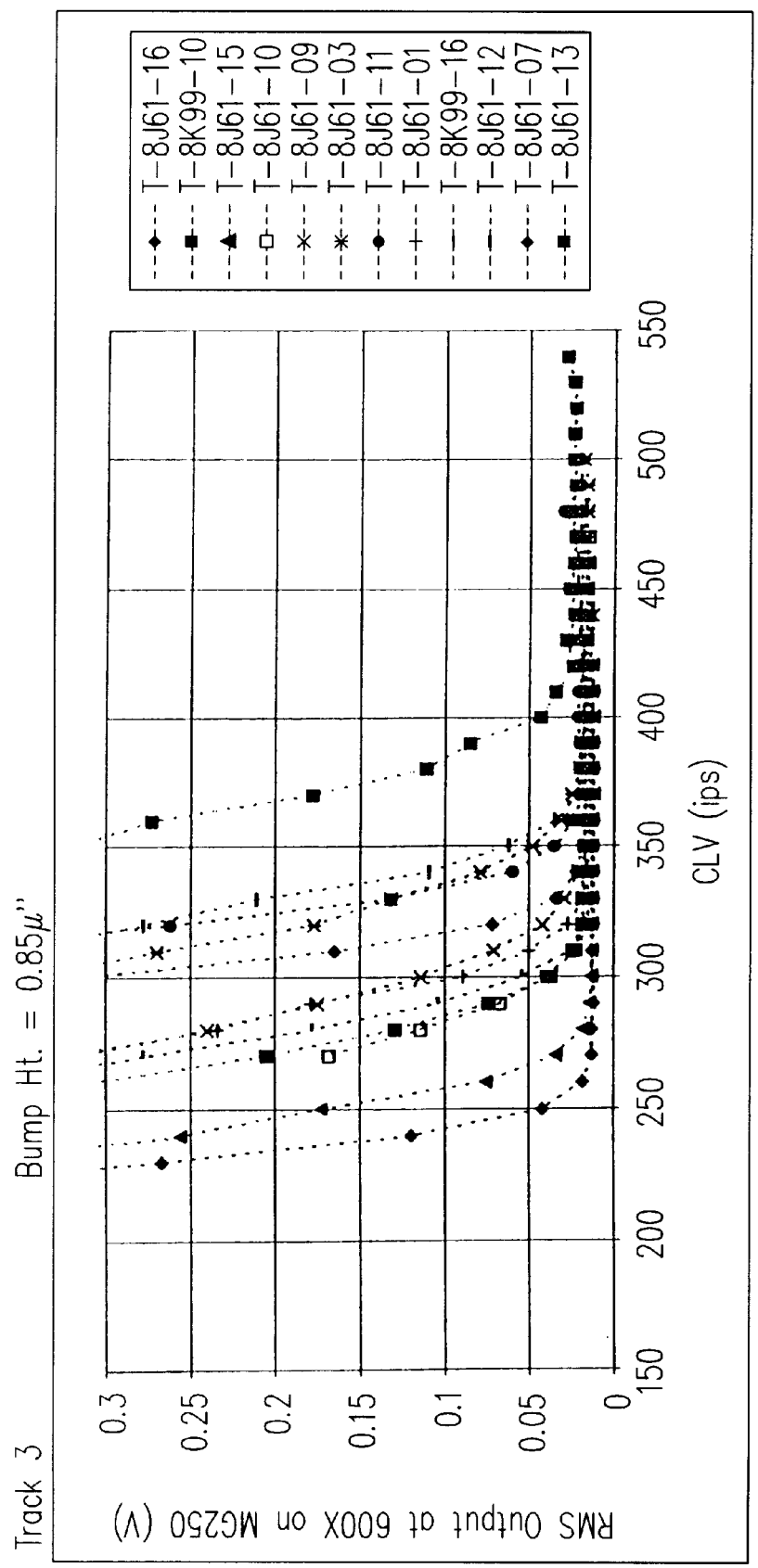
Figure 23C:
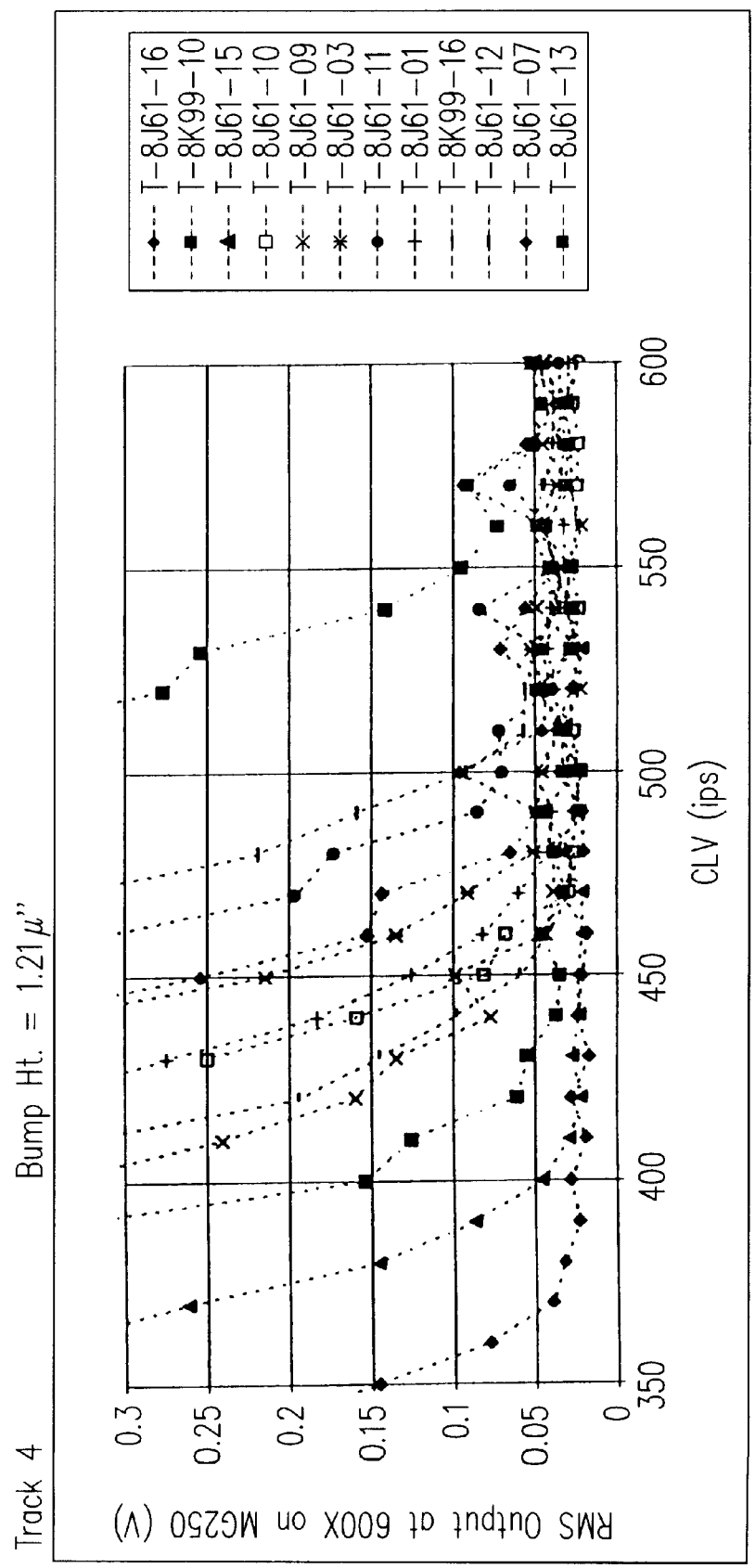

FIGS. 23A, 23B, and 23C show avalanche curves produced by twelve glide heads over three discrete bands of a calibration disk. The X axes of FIGS. 23A, 23B, and 23C is the CLV in ips, while the Y axes are the raw (uncorrected) average output signals generated as a root mean square (RMS) output signal. The testing apparatus is a MG250, with a gain of 600X, an RMS offset of 10 mV, and a filter of 200 kHz to 800 kHz. As can be seen, FIG. 23A is the avalanche curves for the first band of the calibration disk with bump heights of 0.56$\mu$", FIG. 23B is the avalanche curves for the third band with bump heights 0.85$\mu$", and FIG. 23C is the avalanche curves for the fourth band with bump heights 1.21$\mu$". The avalanche curves are generated by starting at a high CLV, e.g., 400 ips in FIG. 23A, so that the glide head has a fly height greater than the bump heights on the band. The CLV is then reduced. As can be seen in the avalanche curves of FIGS. 23A, 23B, and 23C, as the CLV of the glide heads is reduced, which lowers the fly height of the glide head, the RMS output signal is substantially constant until the glide head contacts the bump, i.e., the avalanche point. Once contact is made, the RMS output signal continues to increase as the CLV is reduced.

Figure 24A:
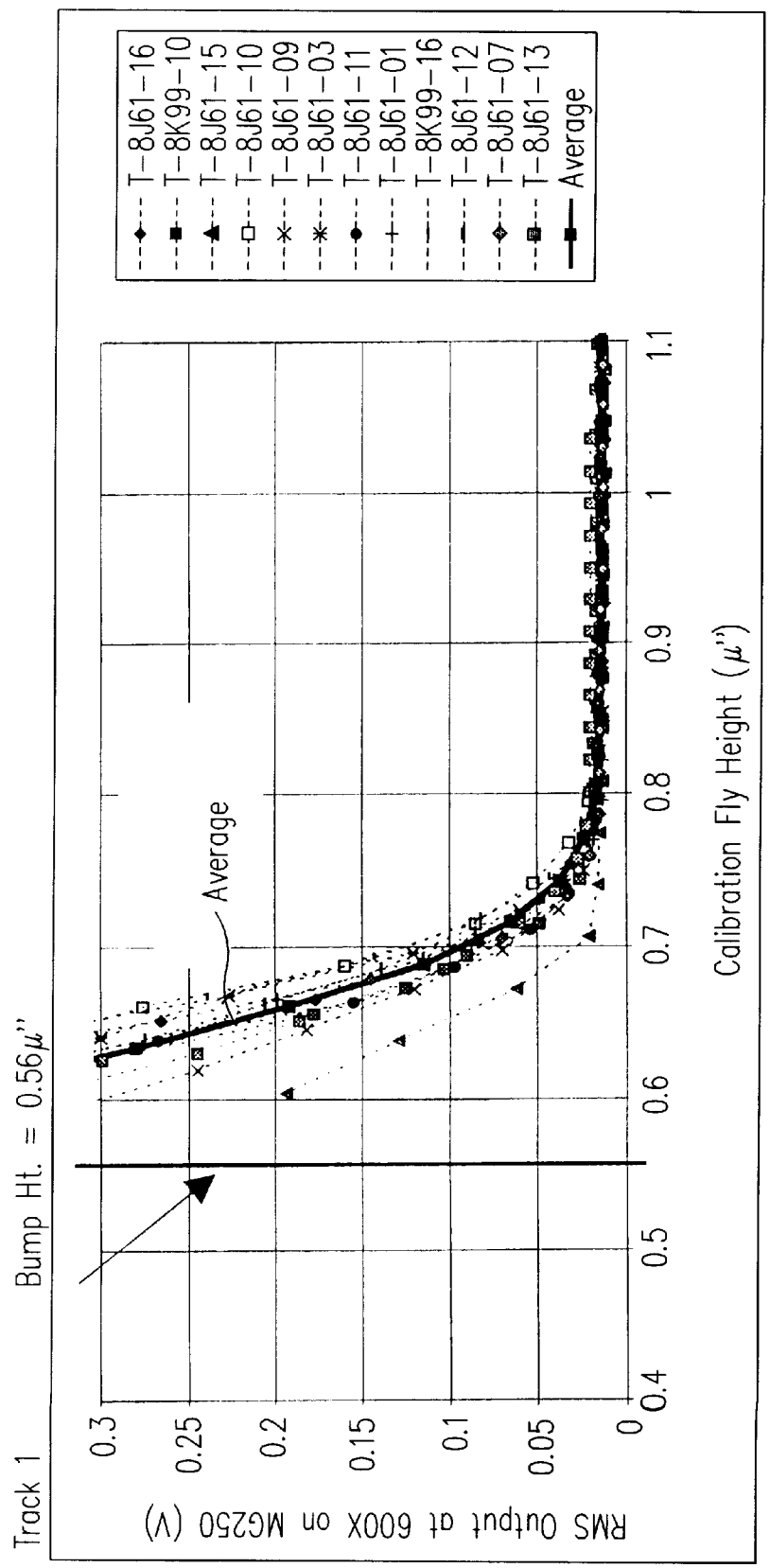
FIGS. 24A, 24B, and 24C are graphs of avalanche curves relating the output signals from the twelve glide heads to the fly heights of the glide heads as determined by the calibration disk.
Figure 24B:
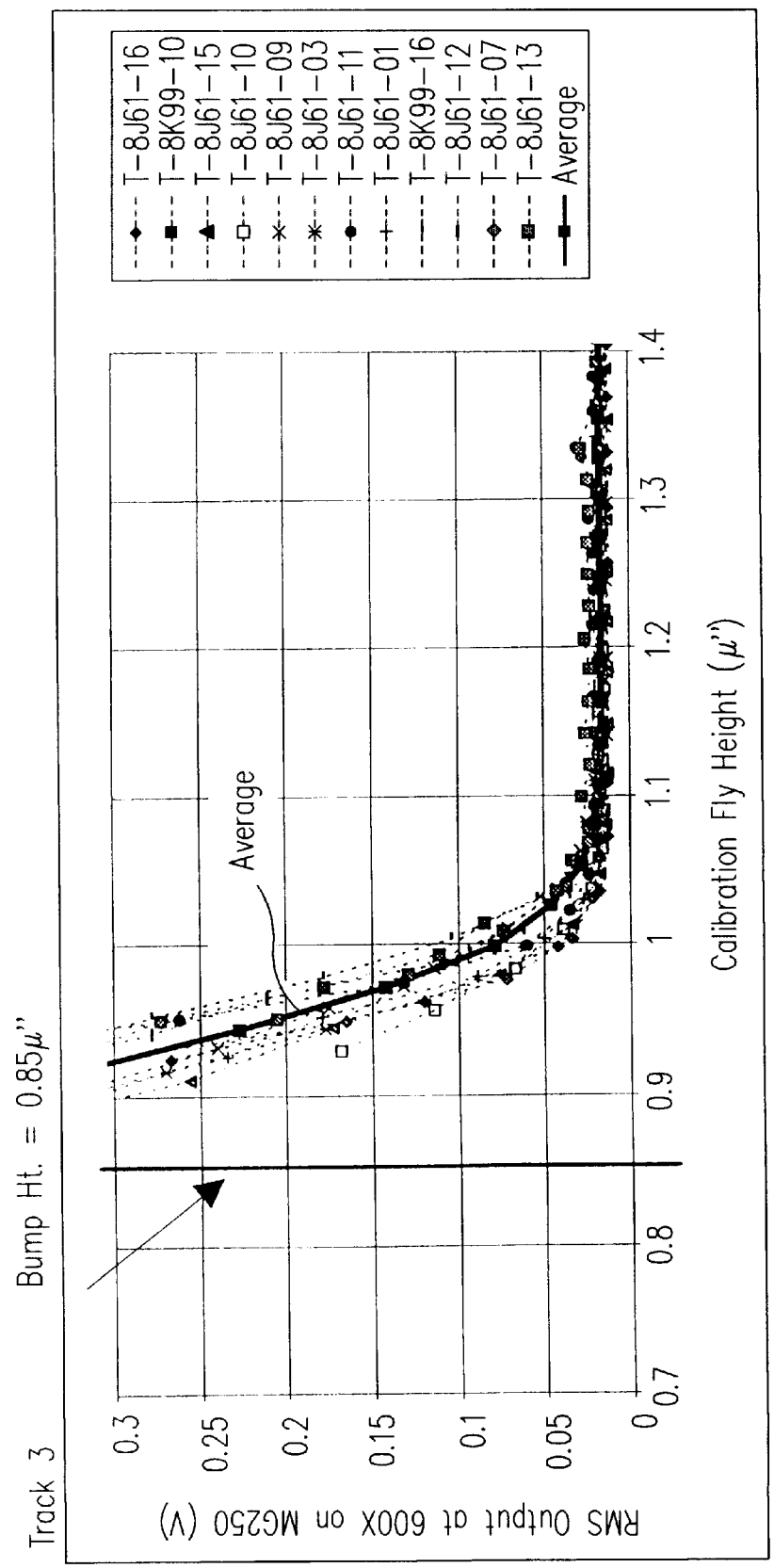
Figure 24C:
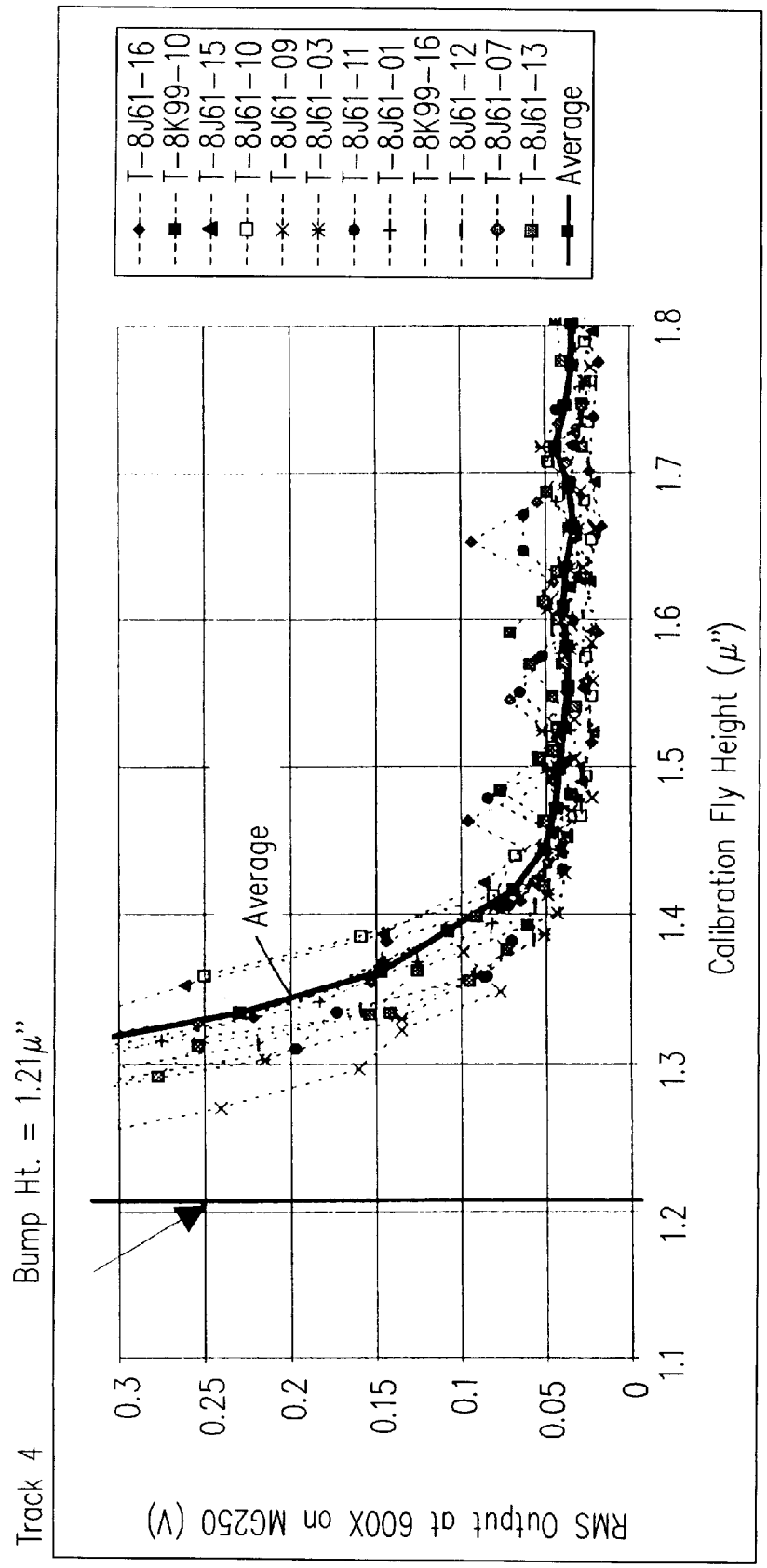

The avalanche curves of FIGS. 23A, 23B, and 23C relating average output signal to CLV can be converted to avalanche curves relating average output signal to fly height using the conversion factors generated in FIG. 22. FIGS. 24A, 24B, and 24C show the avalanche curves of FIGS. 23A, 23B, and 23C converted to fly height using the conversion factors shown in FIG. 22. Also shown in FIGS. 24A, 24B, and 24C are the average converted avalanche curves as well as the bump heights for the individual bands.

Figure 25B:
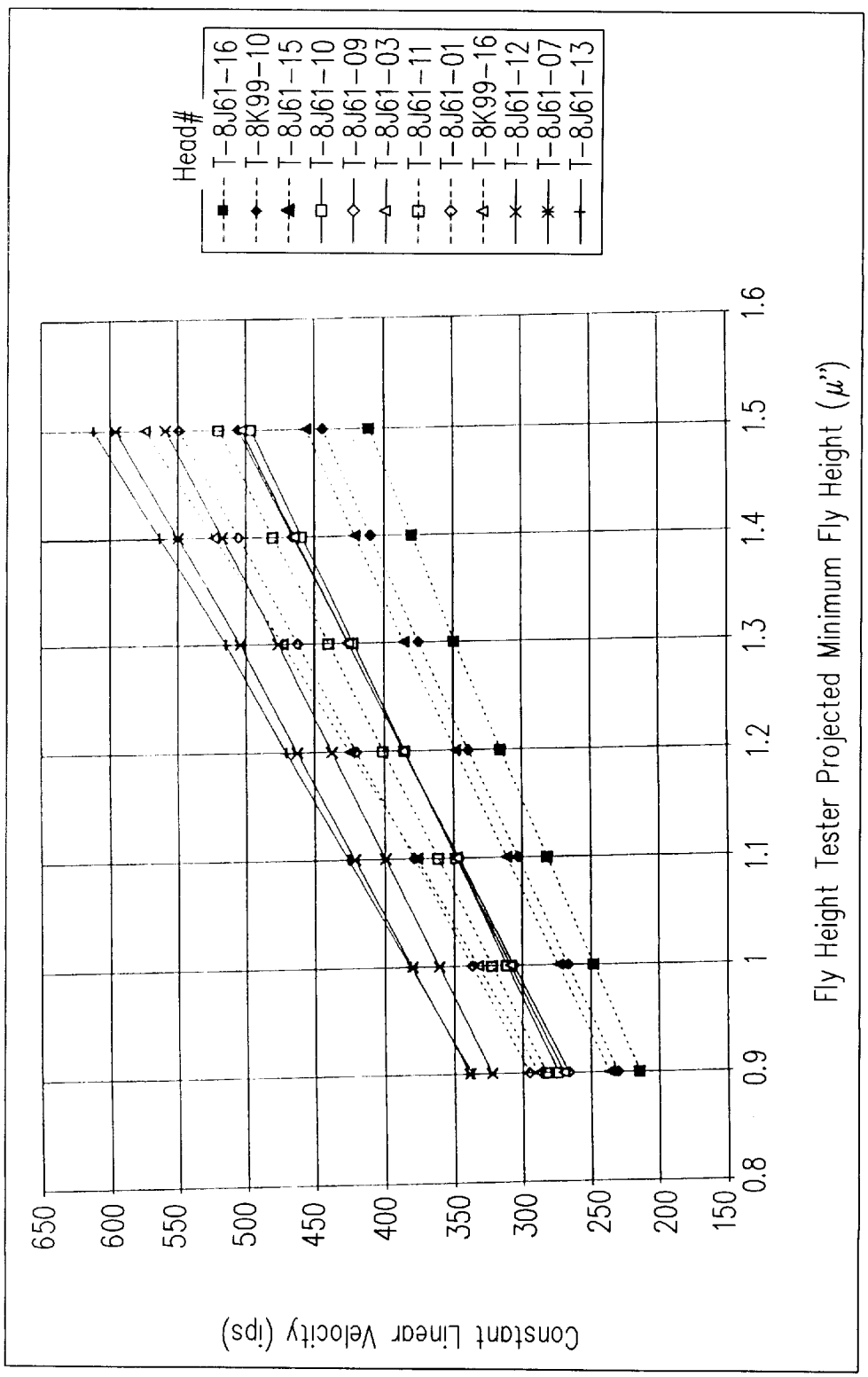

On the other hand, to convert the avalanche curves of FIGS. 23A, 23B, and 23C using the conventional fly height tester, such as a Phasemetrics DFHT, requires separately testing each glide head to relate CLV to fly height. FIG. 25A and 25B show in tabular and graphical form the fly height measurements for the same glide heads used to generate the avalanche curves shown in FIGS. 23A, 23B, and 23C.

Using the fly height tester data shown in FIGS. 25A and 25B, the avalanche curves of FIGS. 23A, 23B, and 23C can be converted into avalanche curves relating the average output signal to the fly height of the glide heads in $\mu$" as shown in FIGS. 26A, 26B, and 26C. Thus, FIGS. 26A, 26B, and 26C show the conventional fly height tester converted avalanche curves relating the average output signals to the fly heights obtained from the fly height tester.

Also shown in FIGS. 26A, 26B, and 26C are the averaged avalanche curves (shown as solid lines) for the twelve glide heads. Also shown in FIGS. 26A, 26B, and 26C are the bump heights for the bands, as indicated by the vertical solid lines. Using the averaged avalanche curves as shown in FIGS. 26A, 26B, and 26C, along with the known bump heights, the average difference between bump height and avalanche points can be determined, as-described in reference to FIG. 20.

Comparing the calibration disk converted avalanche curves of FIGS. 24A, 24B, and 24C to the fly height tester converted avalanche curves of FIGS. 26A, 26B, and 26C, it can be seen that the variation of the individual avalanche curves from the average avalanche curve is smaller in FIGS. 24A, 24B, and 24C than in FIGS. 26A, 26B, and 26C. Further, the calibration disk converted avalanche curves of FIGS. 24A, 24B, and 24C were generated without requiring the extra step of testing the glide heads on a separate fly height tester. The best estimation of glide head fly height should provide curves in which the avalanche points line up regardless of what glide head is used. Thus, the curves shown in FIGS. 24A, 24B, and 24C are better estimations of fly height than that shown in FIGS. 26A, 26B, and 26C.

Figure 27B:
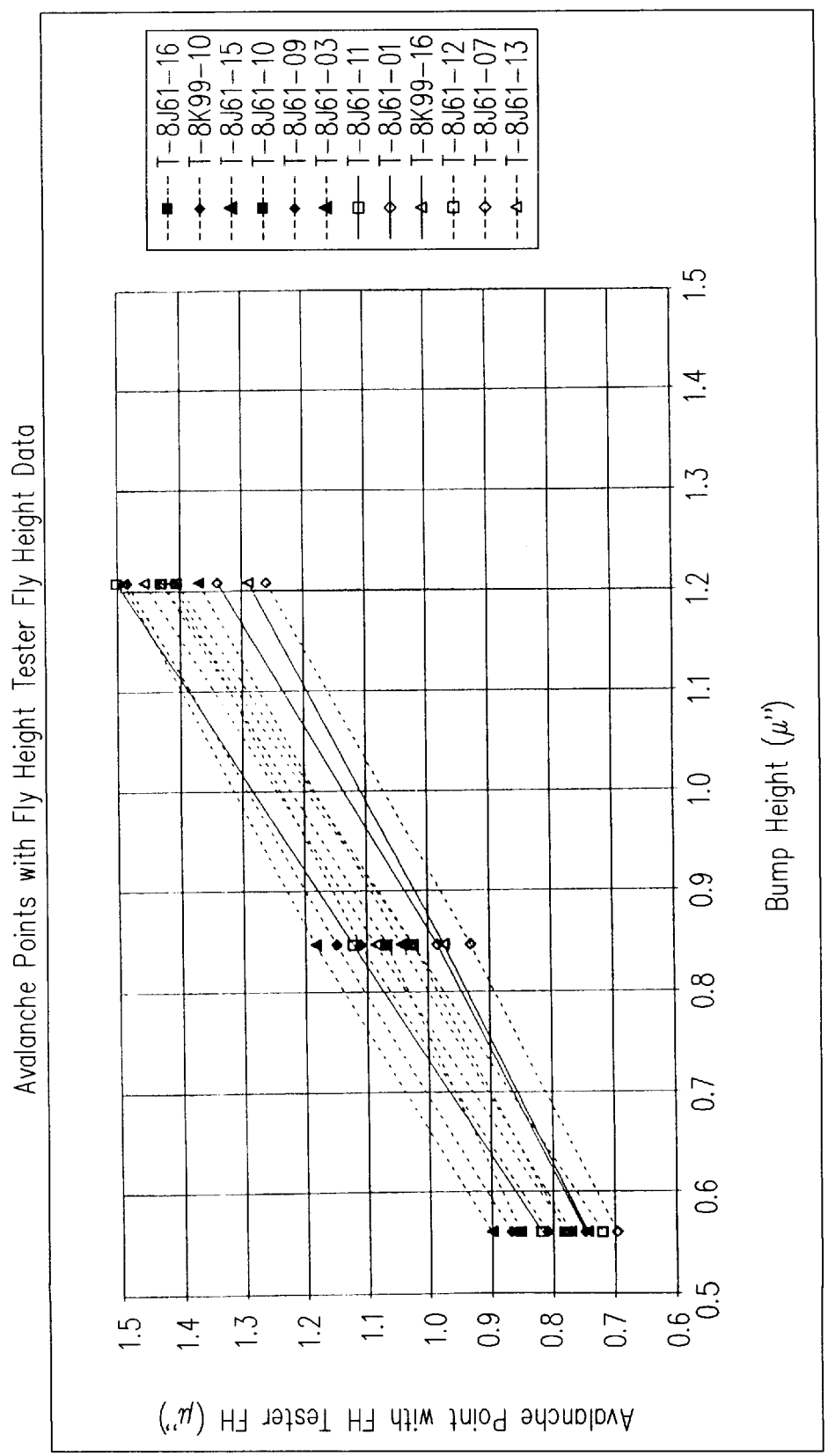
Figure 27C:
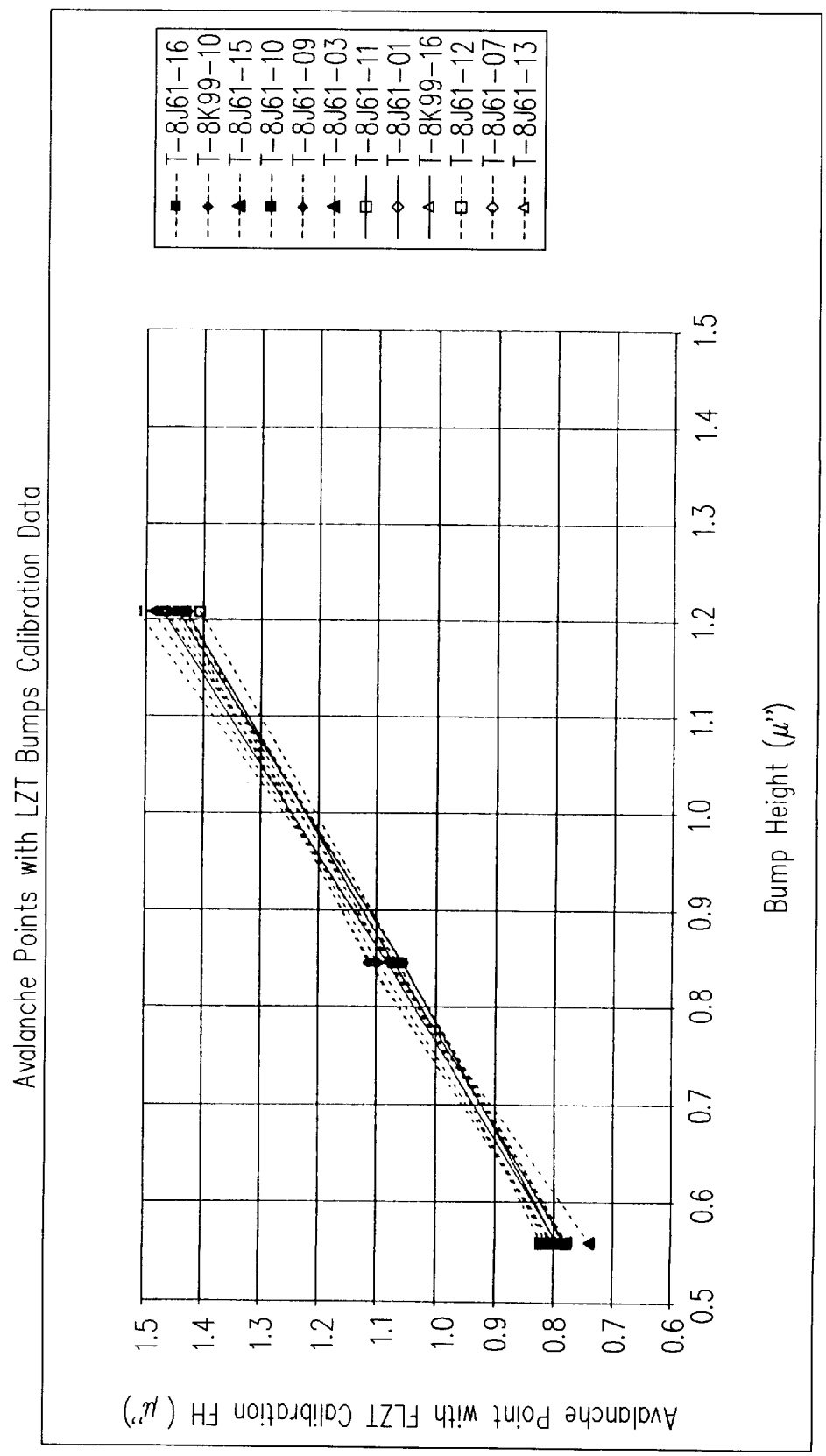

FIG. 27A is a table of the avalanche points for each glide head as shown in FIGS. 23A, 23B, and 23C. The table in FIG. 27A also contains the avalanche points for the calibration disk converted avalanche curves shown in FIGS. 24A, 24B, and 24C as well as the avalanche points for the fly height tester converted avalanche curves shown in FIGS. 26A, 26B, and 26C, both of which are represented graphically in FIGS. 27B and 27C. As can be seen by comparing FIGS. 27B and 27C, the avalanche points obtained using the calibration disk in accordance with the present invention results in a smaller variance in the points than using a conventional fly height tester. Further, as shown in the tables of FIG. 27A, the range and standard deviation for the avalanche points that are converted with the calibration bumps in accordance with the present invention is smaller than the range and standard deviations produced by the conventional fly height tester.

It should be understood that the conversion of the data relating CLV versus bump height to CLV versus fly height can be obtained in alternative ways. The specific numbers used in the conversion factor discussed in the present disclosure were obtained experimentally, and by using additional or different glide heads, the numbers may differ. Thus, numbers used in the conversion factor disclosed in the present disclosure are not intended as a limitation, but as an illustration of how to generate the conversion factor using data relating the bump height, the average difference between avalanche point and bump height, and the average difference between the avalanche point and the height at which the glide head flies to generate a specific output.

The calibration disk with discrete bands can thus be used in production to calibrate a glide head fly height. Because the calibration disk is similar to the production disks being tested, the problems associated with the glass disk of a fly height tester are eliminated. In addition because the glide head is not re-mounted after the calibration process, productivity is improved, and the possibility of error due to glide head installation differences is eliminated. Moreover, error in tester setup affecting the fly height can be detected. In fact, because the present invention relies on actual contact as measured by the glide tester for calibration, any error in the mounting of the glide head to the glide tester will not affect the results. However, top and bottom glide heads used to simultaneously test both top and bottom surfaces of a production disk should have similar flight characteristics. Thus, the calibrated top and bottom glide heads should be within an acceptable range, for example ±0.05$\mu$", for a desired CLV. Where the fly heights of the top and bottom glide heads differ slightly, an average of the two desired velocities may be used.

In addition, should it be necessary to check the calibration of a glide head during the testing of production disks, the re-calibration, like the original calibration, can be performed in-situ without the need to remove the glide head. Furthermore, because the signal used in the present invention arises from actual contact, the present invention ensures that the glide head is calibrated at the lowest flying point. Different measures of contact can be used, such as avalanche, or a specific output signal, i.e., 0.1V.

In practice, it is not necessary that the height at which contact occurs be correlated to fly height as determined by the fly height tester. Rather, the disk of the present invention can simply be used as a calibration standard itself. That is, a glide head can be calibrated by determining the linear velocity versus bump height relationship using the calibration disk. However, it is desired for the glide head to be calibrated relative the current industry standard of fly height, the linear velocity versus bump height relationship can be used to determine the linear velocity at which to fly the glide head on the glide tester during the testing of production disks.

If desired, the point at which contact occurs can be related to fly height. This can be done by correlating the results of testing a glide head on the calibration disk of the present invention with the fly height determined on a fly height tester. For example, the linear velocity at which contact occurs on each band of bumps on the calibration disk for a given glide head can be determined.

The glide head can be tested on a fly height tester to determine the fly height of that glide head as a function of linear velocity. From this, the fly height at which contact occurs for each set of bumps can be determined. This fly height can then be used to determine fly height of subsequent glide heads—that is, subsequent glide heads will contact each set of bumps at approximately the same fly height as that determined from the average of glide heads used to correlate banded bump results to the fly height tester. It will be appreciated that the fly height determined for a subsequent glide head may not be the same as would be determined by correlating the relative linear velocity of the subsequent glide head directly to the fly height tester data of the initial glide head, because the initial glide head and the subsequent glide head may have different flight characteristics at the measured minimum points. However, because the calibration disk is used to correlate the actual lowest point on the glide head to the linear velocity of the glide head, each glide head will be calibrated so that the lowest flying point on the glide head is at approximately the same desired fly height.

Alternatively, from a knowledge of the bump height and other characteristics of the calibration disk, the relationship between average height of the bumps, and height at which contact occurs can be determined. This relationship can then be used to assign a fly height to a set of bumps for a given degree of contact, i.e., an output signal of 0.1V.

Although the present invention has been described in considerable detail with reference to certain versions thereof, other versions are possible. For example, while calibration of glide heads with calibration disk 10 is described in the present disclosure, it should be understood that calibration disk 10 may similarly be used to assure the real fly height of a magnetic head to be used with production magnetic disks. Therefore, the spirit and scope of the appended claims should not be limited to the description of the versions depicted in the figures.

What is claimed is:

1. A calibration disk for calibrating a head having a disk-facing surface and a contact detection sensor, said disk comprising:

a series of spaced circumferential bands extending substantially concentric to each other from adjacent an outer diameter of said disk to adjacent to an inner portion of said disk, each of said bands including substantially circumferencial spaced bumps having a population sufficient to produce a constant output signal from a head when the head flies lower than a maximum height of the bumps; and wherein the height of the bumps within individual bands are substantially uniform.

2. The disk of claim 1, wherein said head is a glide head, said disk further comprising a series of radially extending bumps on each band generally aligned with said circumferencial spaced bumps and wherein the radial spacing between said radially extending bumps is less than a width of a rail of said glide head.

3. The disk of claim 2 wherein the radial spacing is from about 10 µm to about 150 µm.

4. The disk of claim 1 wherein the circumferencial spacing of the bumps is less than the length of said head.

5. The disk of claim 4 wherein said circumferencial spacing of the bumps is from about 20 µm to about 2 mm.

6. The disk of claim 1 wherein said bumps have a diameter of from about 4 µm to about 12 µm.

7. The disk of claim 1 wherein the height of the bumps in one band differs from the height of the bumps in at least one other band.

8. The disk of claim 1 wherein said bumps have a height of from about 50 Å to about 250 Å.

9. The disk of claim 1 wherein an innermost one of said bands is provided on the disk at a radial position which is at least thirty percent or more of the diameter of said disk.

10. The disk of claim 1 further including a circumferencial contact start and stop zone on said disk.

11. The disk of claim 1 wherein a distance between said bands is wider than a width of said head.

12. The disk of claim 1, wherein said head is a glide head having a bump height sensor comprising at least one of a PZT sensor, an acoustic emission sensor, a magnetic-resistive sensor, and a thermal asperity sensor.

13. A method of calibrating a glide head with a calibration disk, said method comprising:

providing a calibration disk, said calibration disk having a substantially circular band of spaced features;

flying a glide head over said band of features;

detecting a substantially constant signal indicative of contact between said glide head and said band of features;

recording a linear velocity at which said signal is detected; and based upon the recorded linear velocity, determining a test linear velocity at which to test production disks.

14. The method of claim 13, wherein detecting a substantially constant signal indicative of contact comprises detecting a signal indicative of the avalanche point.

15. The method of claim 14, wherein determining a test linear velocity at which to test production disks comprises:

correlating the linear velocity to the height at which said glide head flies;

determining the height at which said signal is detected;

calculating the difference between the height at which said signal is detected and the height of the features; and generating said test linear velocity based on the height of the asperity to be detected summed with said difference and correlated to linear velocity with said correlation of the linear velocity to the fly height for said glide head.

16. The method of claim 15, wherein determining the height at which said signal is detected comprises:

determining the fly height at which said signal is detected based on said recorded linear velocity and the correlation of the linear velocity to the fly height for said glide head.

17. The method of claim 13, wherein said calibration disk further comprises a plurality of said circular bands of spaced features at different radii from one another, at least one of said plurality of circular bands comprising said features having a different average height than those of another of said plurality of circular bands, and wherein said method is performed using a plurality of said circular bands.

18. The method of claim 17, wherein detecting a substantially constant signal indicative of contact comprises detecting a signal indicative of the avalanche point.

19. The method of claim 18, wherein determining a test linear velocity at which to test production disks comprises:

determining the linear velocities at the avalanche points for said plurality of circular bands;

correlating the linear velocities at the avalanche points for said plurality of circular bands to the average height of the features on said plurality of circular bands; and generating the test linear velocity based on the height of the asperity to be detected and the correlation of the linear velocities at the avalanche points for said plurality of circular band to the average height of the features.

20. The method of claim 17, wherein:

flying a glide head over the plurality of bands of features comprises performing a radial scan of said disk; and recording a linear velocity at which said signal is detected comprises recording the linear velocity when said glide head generates an output signal of specific magnitude for each of said plurality of bands.

21. The method of claim 20, wherein determining a test linear velocity at which to test production disks comprises:

producing a relationship between said bump heights for said plurality of bands and the recorded linear velocities; and generating the test linear velocity based on the desired height at which said glide head flies during testing and the relationship between height at which said glide head flies and said linear velocity.

22. The method of claim 21, further comprising:

converting said relationship between said bump heights for said plurality of bands and said recorded linear velocities to a relationship between fly height and linear velocity; and generating the test linear velocity based on the desired fly height of said glide head during testing and the relationship between fly height and said linear velocity.

23. The method of claim 22, wherein converting said relationship comprises:

adding a conversion factor to said bump heights to produce fly heights when said output signal is of said specific magnitude; and using curve fitting to generate said relationship between fly height and linear velocity.

24. The method of claim 23, wherein said conversion factor is generated by:

generating a first difference between the linear velocity at an avalanche point and the average linear velocity when the output signal of a glide head is of said specific magnitude;

converting said first difference into an average height difference;

generating a second difference between an average height of an avalanche point and a feature height; and summing said average height difference and said second difference.

* * * * *